(12) United States Patent
Ji et al.

(10) Patent No.: US 10,313,913 B2
(45) Date of Patent: Jun. 4, 2019

(54) OVERLOAD CONTROL AND SUPERVISION FOR WIRELESS DEVICES

(71) Applicant: QUALCOMM Incorporated, San Diego, CA (US)

(72) Inventors: Tingfang Ji, San Diego, CA (US); Peter Gaal, San Diego, CA (US); Hao Xu, San Diego, CA (US); Miguel Griot, La Jolla, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 14/273,478

(22) Filed: May 8, 2014

(65) Prior Publication Data

US 2014/0334299 A1 Nov. 13, 2014

Related U.S. Application Data

(60) Provisional application No. 61/821,580, filed on May 9, 2013.

(51) Int. Cl.
*H04W 4/70* (2018.01)
*H04W 28/02* (2009.01)
(Continued)

(52) U.S. Cl.
CPC ... *H04W 28/0221* (2013.01); *H04W 28/0205* (2013.01); *H04W 52/0216* (2013.01);
(Continued)

(58) Field of Classification Search
CPC ............. H04W 4/005; H04W 28/0205; H04W 28/0221; H04W 52/0216; H04W 72/1284;
(Continued)

(56) References Cited

U.S. PATENT DOCUMENTS 5,768,531 A 6/1998 Lin
9,198,128 B2 * 11/2015 Kim ................. H04W 52/0216
(Continued)

FOREIGN PATENT DOCUMENTS

CN 101361298 A 2/2009
CN 102440057 A 5/2012
(Continued)

OTHER PUBLICATIONS

ISA/EPO, Partial International Search Report of the International Searching Authority, Int'l. App. No. PCT/US2014/037469, dated Dec. 8, 2014, European Patent Office, Rijswijk, NL 6 pgs.
(Continued)

*Primary Examiner* — Asad M Nawaz
*Assistant Examiner* — Kai Chang
(74) *Attorney, Agent, or Firm* — Holland & Hart LLP

(57) ABSTRACT

Methods, systems, and/or devices are described for are provided for transmission overload control and/or supervision of wireless devices. Tools and techniques may be provided for resolving issues associated with numerous wireless devices connected to a base station. For example, a transmission cycle for an uplink channel may be identified where the transmission cycle is discontinuous. Scheduling request and or Random Access Channel messages may be transmitted from a wireless device based on the discontinuous transmission cycle. Tools and techniques are also provided that may involve supervision of numerous wireless devices. Supervision may, for example, involve keep-alive messages transmitted in accordance with a timer. The supervision may be based on determination of, and transmissions related to, a list or lists of connected wireless devices. In some cases, the wireless devices may be delay tolerant. The wireless devices may include UEs that may have long sleep
(Continued)

cycles and/or machine-type communications (MTC) devices.

16 Claims, 21 Drawing Sheets

(51) Int. Cl.
    H04W 52/02 (2009.01)
    H04W 72/12 (2009.01)
    H04W 74/08 (2009.01)
    H04W 76/28 (2018.01)
    H04W 92/18 (2009.01)

(52) U.S. Cl.
    CPC ....... *H04W 72/1284* (2013.01); *H04W 76/28* (2018.02); *H04W 4/70* (2018.02); *H04W 74/0833* (2013.01); *H04W 92/18* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/21* (2018.01); *Y02D 70/22* (2018.01); *Y02D 70/24* (2018.01); *Y02D 70/25* (2018.01)

(58) Field of Classification Search
    CPC ............ H04W 74/0833; H04W 76/04; H04W 76/048; H04W 92/18; H04W 4/70; H04W 76/28; Y02D 70/00; Y02D 70/1242; Y02D 70/1262; Y02D 70/1264; Y02D 70/142; Y02D 70/144; Y02D 70/146; Y02D 70/162; Y02D 70/21; Y02D 70/22; Y02D 70/24; Y02D 70/25
    See application file for complete search history.

(56) References Cited

U.S. PATENT DOCUMENTS

| | | | | |
|---|---|---|---|---|
| 9,253,795 | B2* | 2/2016 | Fan .................. | H04W 4/005 |
| 2005/0255843 | A1 | 11/2005 | Hilpisch et al. | |
| 2008/0075013 | A1 | 3/2008 | Kim | |
| 2008/0132230 | A1* | 6/2008 | Marinier .............. | H04W 48/08 455/434 |
| 2009/0067389 | A1 | 3/2009 | Lee et al. | |
| 2009/0168731 | A1* | 7/2009 | Zhang ................. | H04L 1/1854 370/336 |
| 2009/0180414 | A1* | 7/2009 | Maeda ................ | H04B 7/2643 370/311 |
| 2009/0191883 | A1* | 7/2009 | Choi .................... | H04W 76/28 455/450 |
| 2009/0232118 | A1* | 9/2009 | Wang .................. | H04L 5/0091 370/338 |
| 2009/0274086 | A1* | 11/2009 | Petrovic ............... | H04J 11/0093 370/312 |
| 2009/0303977 | A1* | 12/2009 | Hsu ..................... | H04L 1/0007 370/345 |
| 2010/0034142 | A1* | 2/2010 | Harris ................. | H04W 52/0245 370/328 |
| 2010/0120378 | A1* | 5/2010 | Harada ................ | H04W 76/28 455/88 |
| 2010/0130219 | A1* | 5/2010 | Cave ................... | H04W 72/02 455/450 |
| 2010/0246499 | A1* | 9/2010 | Kim .................... | H04W 72/1289 370/329 |
| 2010/0290509 | A1* | 11/2010 | Dalsgaard .......... | H04W 76/005 375/220 |
| 2010/0323683 | A1* | 12/2010 | Kazmi ................ | H04W 64/00 455/422.1 |
| 2011/0044263 | A1* | 2/2011 | El-saidny ............ | H04W 52/12 370/329 |
| 2011/0237231 | A1* | 9/2011 | Horneman .......... | H04W 76/048 455/414.1 |
| 2011/0258327 | A1* | 10/2011 | Phan .................... | H04W 16/10 709/227 |
| 2011/0286499 | A1* | 11/2011 | Panicker ............. | H04L 25/0204 375/148 |
| 2011/0310854 | A1 | 12/2011 | Zou et al. | |
| 2012/0014343 | A1* | 1/2012 | Womack ............ | H04L 5/0094 370/329 |
| 2012/0014361 | A1* | 1/2012 | Jung ................... | H04W 76/048 370/338 |
| 2012/0082192 | A1* | 4/2012 | Pelletier ............... | H04B 7/0678 375/219 |
| 2012/0113825 | A1* | 5/2012 | Baglin ................ | H04W 24/00 370/252 |
| 2012/0115471 | A1* | 5/2012 | Awoniyi ........... | H04W 52/0206 455/435.1 |
| 2012/0147794 | A1* | 6/2012 | Chung ............... | H04W 72/0406 370/280 |
| 2012/0190362 | A1* | 7/2012 | Subbarayudu ...... | H04W 76/048 455/435.1 |
| 2012/0264449 | A1* | 10/2012 | Kazmi ................ | G01S 5/0205 455/456.1 |
| 2013/0039347 | A1* | 2/2013 | Moqvist .............. | H04L 1/1822 370/335 |
| 2013/0308465 | A1* | 11/2013 | Xu ...................... | H04W 76/048 370/241 |
| 2014/0018085 | A1* | 1/2014 | Young ................ | H04W 52/0235 455/450 |
| 2014/0064206 | A1* | 3/2014 | Bao ................... | H04W 72/1278 370/329 |
| 2014/0133430 | A1* | 5/2014 | Yang ................... | H04L 1/1854 370/329 |
| 2014/0286215 | A1* | 9/2014 | Koc .................... | H04W 28/24 370/311 |
| 2015/0131631 | A1* | 5/2015 | Chen ................... | H04W 24/02 370/336 |
| 2016/0057701 | A1* | 2/2016 | Choi ................... | H04W 52/0216 370/311 |

FOREIGN PATENT DOCUMENTS

| | | |
|---|---|---|
| CN | 103053215 A | 4/2013 |
| EP | 0993214 A1 | 4/2000 |
| EP | 2031775 A1 | 3/2009 |
| EP | 2088714 A1 | 8/2009 |
| EP | 2362697 A1 | 8/2011 |
| JP | 2012525083 A | 10/2012 |
| JP | 2013531946 A | 8/2013 |
| WO | WO-2007145035 A1 | 12/2007 |
| WO | WO-2011159597 A1 | 12/2007 |
| WO | WO-2010024961 A1 | 3/2010 |
| WO | WO-2010124228 A2 | 10/2010 |
| WO | WO-2012134551 A2 | 10/2012 |
| WO | WO-2013002577 A2 | 1/2013 |

OTHER PUBLICATIONS

ISA/EPO, International Search Report and Written Opinion of the International Searching Authority, Int'l. App. No. PCT/US2014/037469, dated Jan. 30, 2015, European Patent Office, Rijswijk, NL 17 pgs.

Alcatel-Lucent, et al., "Text Proposal to TR25.927 on NodeB DTX", 3GPP TSG-RAN WG1#60b R1-101847, Apr. 12, 2010, 12 Pages, URL: http://www.3gpp.org/ftp/tsg_ran/WG1_RL1/TSGR1_60b/Docs/R1-101847.zip.

* cited by examiner

OVERLOAD CONTROL AND SUPERVISION FOR WIRELESS DEVICES

CROSS REFERENCES

The present Application for Patent claims priority to U.S. Provisional Patent Application No. 61/821,580 by Ji et al., entitled "OVERLOAD CONTROL AND SUPERVISION FOR WIRELESS DEVICES," filed May 9, 2013, assigned to the assignee hereof, and expressly incorporated by reference herein.

BACKGROUND

Different types of wireless devices may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. These devices may be called M2M devices, MTC devices and/or MTC user equipments (UEs).

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. The market for MTC devices is expected to grow rapidly as industries such as automotive, security, healthcare, and fleet management employ MTC to increase productivity, manage costs, and/or expand customer services. For example, it is estimated that the MTC connectivity market may grow to over 200 million devices employed in the field by 2014.

MTC devices may use a variety of wired and/or wireless communication technologies. For example, MTC devices may communicate with a network over various wireless cellular technologies such as 3GPP Long Term Evolution (LTE) and/or LTE-Advanced (LTE-A) and/or various wireless networking technologies (e.g., IEEE 802.11 (Wi-Fi), IEEE 802.16 (WiMAX), etc.). MTC devices may also communicate with one another using various peer-to-peer technologies such as Bluetooth, ZigBee, and/or other ad-hoc or mesh network technologies. The expansion of multiple access wireless networks around the world has made it far easier for MTC communication to take place and has lessened the amount of power and time necessary for information to be communicated between machines. These networks also allow an array of new business opportunities and connections between consumers and producers in terms of the products being sold.

The increasing number and reliance on MTC devices may create issues associated with scheduling transmissions, allocating resources, and managing context data associated with the MTC devices. Similar issues may also arise with user equipment (UEs) having long sleep cycles and/or other devices that may be capable of operating for extended time periods without transmitting or receiving a signal from another device or a base station.

SUMMARY

The described features generally relate to one or more improved systems, methods, and/or devices for transmission overload control and/or supervision of wireless devices. The systems, methods, and/or devices may include tools and techniques for resolving issues associated with numerous wireless devices connected to a base station.

Some embodiments include methods for overload control for one or more wireless devices in a connected state in a wireless communications system. In some embodiments, the methods may include identifying a first transmission cycle for an uplink channel. The methods may further include identifying a first off cycle with respect to the first transmission cycle for the uplink channel. The wireless device may refrain from transmitting during the first off cycle. Transmissions may occur according to the identified first transmission cycle. The transmissions may include, for example, a scheduling request or a random access channel message transmitted from a wireless device.

In some methods, the wireless device may be a delay-tolerant device. Delay tolerance may be defined with respect to a threshold. For example, a delay-tolerant device may be a device that is capable of operating for extended periods of time without communicating with another device and/or a base station. In some embodiments, delay tolerance is linked to a transmission cycle. In some aspects, the wireless device may be a UE with a long sleep cycle and/or an MTC device.

In some embodiments, the methods may include overload control for wireless devices that are part of a first set of wireless devices, which may utilize the first transmission cycle. Some other wireless devices may be part of a second set of wireless devices, which may utilize a second transmission cycle. The second transmission cycle may be staggered from the first cycle.

In some methods, the first transmission cycle may include staggered periods during which one or more components of a wireless device is powered on. In some embodiments, a discontinuous transmission (DTX) cycle includes the first transmission cycle and the first off cycle. The DTX cycle may utilize one or more timers for powering on and/or monitoring one or more components of the wireless devices. In some embodiments, the methods may include receiving an indication of the DTX cycle from a base station, and transmitting according to the received DTX cycle indication. In some embodiments, the methods may further include utilizing a discontinuous reception (DRX) cycle mask comprising DRX ON durations and DRX OFF durations, wherein the wireless device refrains from receiving during the DRX OFF durations.

In some methods, the first transmission cycle may correspond to a discontinuous reception (DRX) cycle. Some DRX ON durations of the DRX cycle may coincide with a DTX ON duration of the DTX cycle. In such cases, the DTX cycle may have a shorter period than the DRX cycle. In some embodiments, some DTX ON durations of the DTX cycle coincide with a DRX ON duration of the DRX cycle. In such cases, the DRX cycle may have a shorter period than the DTX cycle. In some embodiments, the features include a DRX cycle mask, which may provide that a wireless device is not required to receive during DRX OFF periods.

In some methods, the connected wireless device is in an RRC_CONNECTED state. The wireless device may be an ultra-low power device. In some embodiments, the methods may include receiving the first transmission cycle from a base station, such as an eNodeB (eNB). In some embodiments, the methods include a wireless device remaining in an RRC_CONNECTED state while in a sleep mode. The wireless device may operate according to the first transmission cycle received from the base station.

Some embodiments include systems for overload control for one or more wireless devices in a connected state in a wireless communications system. The systems may include means for identifying a first transmission cycle for an uplink channel. The system may further include means for identifying a first off cycle with respect to the first transmission cycle for an uplink channel. The wireless device may refrain from transmitting during the first off cycle. The systems may also include means for transmitting, which may occur according to the identified first transmission cycle. The transmissions may include, for example, at least a scheduling request or a random access channel message transmitted from a wireless device.

In some systems, the wireless device may be a delay-tolerant device. Delay tolerance may be defined with respect to a threshold. For example, a delay-tolerant device may be a device that is capable of operating for extended periods of time without communicating with another device and/or a base station. In some embodiments, delay tolerance may be linked to a transmission cycle. In some aspects, the wireless device may be a UE with a long sleep cycle and/or an MTC device.

In some systems, the wireless device may be part of a first set of wireless devices with means for utilizing the first transmission cycle. Some other wireless devices may be part of a second set of wireless devices with means for utilizing a second transmission cycle. The second transmission cycle may be staggered from the first cycle.

In some systems, the first transmission cycle may include staggered periods during which one or more components of a wireless device is powered on. In some embodiments, a discontinuous transmission (DTX) cycle includes the first transmission cycle and the first off cycle. The systems may further comprise means for the DTX cycle to utilize one or more timers for powering on and/or monitoring one or more components of the wireless devices. In some embodiments, the systems further comprise means for receiving an indication of the DTX cycle from a base station, and means for transmitting according to the received DTX cycle indication. In some embodiments, the systems further comprise means for utilizing a discontinuous reception (DRX) cycle mask, which includes DRX ON durations and DRX OFF durations, wherein the wireless device refrains from receiving during the DRX OFF durations.

In some systems, the first transmission cycle corresponds to a discontinuous reception (DRX) cycle. Some DRX ON durations of the DRX cycle may coincide with some DTX ON durations of the DTX cycle. In such cases, the DTX cycle may have a shorter period than the DRX cycle. In some embodiments, some DTX ON durations of the DTX cycle coincide with some DRX ON durations of the DRX cycle. In such cases, the DRX cycle may have a shorter period than the DTX cycle.

In some systems, the connected wireless device is in an RRC_CONNECTED state. The wireless device may be an ultra-low power device. In some aspects, the system may include means for receiving the first transmission cycle from a base station, such as an eNB. In some embodiments, the systems may include means for the wireless device remaining in an RRC_CONNECTED state while in a sleep mode.

Some aspects may include means for operating the wireless device according to the first transmission cycle received from the base station.

Some embodiments include devices for overload control for one or more wireless devices in a connected state in a wireless communications system. In some embodiments, the devices include at least one processor with a memory coupled to the processor. The processor may be configured to identify a first transmission cycle for an uplink channel. In some embodiments, the processor may be configured to identify a first off cycle with respect to the first transmission cycle for the uplink channel. The wireless device refrain from transmitting during the first off cycle. In some embodiments, the processor is configured to transmit at least a scheduling request or a random access channel message according to the identified first transmission cycle from the wireless device.

In some embodiments, the wireless device may be part of a first set of wireless devices utilizing the first transmission cycle. Some other wireless devices may be part of a second set of wireless devices utilizing a second transmission cycle. The second transmission cycle may be staggered from the first cycle.

In some embodiments, the wireless device may be a delay-tolerant device. Delay tolerance may be defined with respect to a threshold. For example, a delay-tolerant device may be a device that is capable of operating for extended periods of time without communicating with another device and/or a base station. In some embodiments, delay tolerance may be linked to a transmission cycle. In some embodiments, the wireless device may be a UE with a long sleep cycle and/or an MTC device.

In some embodiments, the first transmission cycle may include staggered periods during which one or more components of a wireless device is powered on. In some embodiments, a discontinuous transmission (DTX) cycle comprises the first transmission cycle and the first off cycle. The processor may be further configured for the DTX cycle to utilize one or more timers for powering on and/or monitoring one or more components of the wireless devices. In some embodiments, the processor may be configured further to receive an indication of the DTX cycle from a base station, and to transmit according to the received DTX cycle indication. In some embodiments, the processor may be configured to utilize a discontinuous reception (DRX) cycle mask comprising DRX ON durations and DRX OFF durations, wherein the wireless device refrains from receiving during the DRX OFF durations.

In some embodiments, the first transmission cycle corresponds to a discontinuous reception (DRX) cycle. Some DRX ON durations of the DRX cycle may coincide with some DTX ON durations of the DTX cycle. In such cases, the DTX cycle may have a shorter period than the DRX cycle. In some embodiments, some DTX ON durations of the DTX cycle coincide with some DRX ON durations of the DRX cycle. In such cases, the DRX cycle may have a shorter period than the DTX cycle.

In some embodiments, the connected wireless device is in an RRC_CONNECTED state. The wireless device may be an ultra-low power device. In some embodiments, the processor may be configured to receive the first transmission cycle from a base station, such as an eNB. In some embodiments, the wireless device may include a processor configured for the wireless device remaining in an RRC_CONNECTED state while in a sleep mode. Some embodiments may include instructions executable by the processor to operate the wireless device according to the first transmission cycle received from the base station.

Some embodiments include computer program products for overload control for one or more wireless devices in a connected state in a wireless communications system. In some embodiments, the computer program products may include a non-transitory computer readable medium having program code recorded on it. The program code may include instructions for identifying a first transmission cycle for an uplink channel. The program code may include instructions for identifying a first off cycle with respect to the first transmission cycle for the uplink channel. The wireless device may refrain from transmitting during the first off cycle. In some embodiments, the program code may include instructions for transmitting at least a scheduling request or a random access channel message according to the identified first transmission cycle from the wireless device.

Some embodiments include methods for supervision of wireless devices in a wireless communications system. The methods may include initiating a timer at a wireless device after a handshake between the wireless device and a base station, such as an eNB. The wireless device may transmit a keep-alive handshake initiation message to the base station upon expiration of the timer. The handshake may include transmitting a first message and receiving a first response, which corresponds to the first message. Additionally or alternatively, the handshake may include receiving a second message and transmitting a second response, which corresponds to the second message.

In some embodiments of the method, the wireless device may be a delay-tolerant device. Delay tolerance may be defined with respect to a threshold. For example, a delay-tolerant device may be a device that is capable of operating for extended periods of time without communicating with another device and/or a base station. In some embodiments, delay tolerance may be linked to a transmission cycle. The wireless device may be a UE with a long sleep cycle and/or an MTC device.

The keep-alive handshake initiation message may be a random access channel message. In some embodiments, the methods include listening to a response message and replying with a closing message. In some embodiments, the keep-alive handshake initiation message is a scheduling request. In some embodiments, the methods include listening to an uplink grant and replying in a payload with a closing message. The methods may further include resetting the timer after the handshake.

Some embodiments include systems for supervision of wireless devices in a wireless communications system. In some embodiments, the systems include means for initiating a timer at a wireless device after a handshake between the wireless device and an base station. The systems may further include means for transmitting a keep-alive handshake initiation message to the base station upon expiration of the timer.

The keep-alive handshake initiation message may include, for example, a random access channel message. The systems may further include means for listening to a response message and means for replying with a closing message. In some embodiments, the keep-alive handshake initiation message is a scheduling request. The systems may include means for listening to an uplink grant and replying in a payload with a closing message. The systems may further include means for retting the timer after the handshake.

Some embodiments include devices for supervision of wireless devices in a wireless communications system. In some embodiments, the devices include at least one processor and a memory coupled to the processor. The processor may be configured to initiate a timer at a wireless device after a handshake between the wireless device and a base station. The processor may also be configured to transmit a keep-alive handshake initiation message to the base station upon expiration of the timer.

Some embodiments include computer program products for supervision of wireless devices in a wireless communications system. In some examples, the computer program products include a non-transitory computer readable medium having program code recorded on it. The program code may include instructions for initiating a timer at a wireless device after a handshake between the wireless device and a base station. The program code may also include instructions for transmitting a keep-alive handshake initiation message to the base station upon expiration of the timer.

Some embodiments include methods for supervision of wireless devices in a wireless communications system. In some embodiments, the methods include determining a list of connected wireless devices and broadcasting one or more messages that include the list of connected wireless devices. The methods may further include receiving a message from a wireless device that the wireless device is not on the list of connected wireless devices. The list of connected devices may, for example, include one or more wireless devices that have not transmitted a keep-alive message within a time period. In some embodiments, the broadcasting one or more messages includes transmitting a plurality of messages based on a staggered DRX cycle. Some messages from the plurality of messages may include a subset of connected wireless devices form the list of connected wireless devices.

In some embodiments, the wireless device or devices are delay tolerant. Delay tolerance may be defined with respect to a threshold. In some examples, delay tolerance may be linked to the first transmission cycle. In some embodiments, the wireless device or devices include a UE with a long sleep cycle or an MTC device.

Some embodiments include systems for supervision of wireless devices in a wireless communications system. In some examples, the systems include means for determining a list of connected wireless devices and means for broadcasting one or more messages including the list of connected wireless devices. In some embodiments, the systems further include means for receiving a message from a wireless device that the wireless device is not on the list of connected devices. The list of connected devices may include one or more wireless devices that have not transmitted a keep-alive handshake initiation message within a time period.

In some embodiments, the means for broadcasting the one or more messages includes means for transmitting a plurality of messages bases on a staggered DRX cycle. Some messages from the plurality of messages may include a subset of connected wireless devices from the list of connected wireless devices.

Some embodiments include devices for supervision of wireless devices in a wireless communications system. In some embodiments, the devices include at least one processor and a memory coupled to the processor. The processor may be configured to determine a list of connected devices and broadcast one or more messages including the list of connected devices.

Some embodiments include computer program products for supervision of wireless devices in a wireless communications system. In some embodiments, the computer program product may include a non-transitory computer readable medium having program code recorded on it. The program code may include instructions for determining a list of connected devices and broadcasting one or more messages including the list of connected devices.

Further scope of the applicability of the described methods, systems, and devices will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
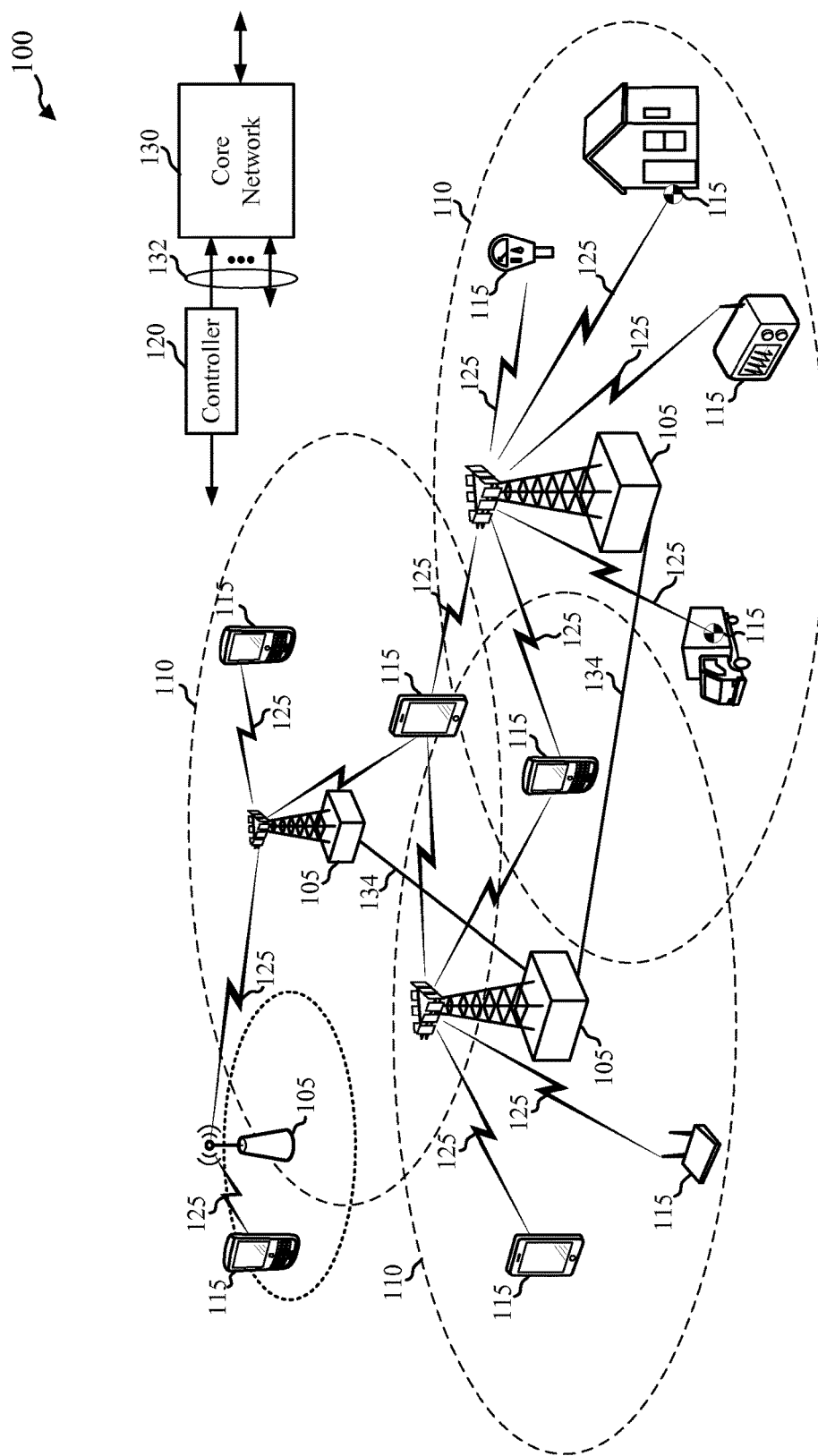
FIG. 1 shows a diagram of a wireless communications system according to some embodiments.

Methods, systems, and devices for transmission overload control and/or supervision of wireless devices are provided in accordance with various embodiments. The methods, systems, and device may provide for resolving issues associated with numerous wireless devices connected to a base station. For example, tools and techniques are described that may be used to address issues associated with numerous connected wireless devices attempting to simultaneously transmit on an uplink. Further, tools and techniques are provided that may be used to address issues associated with infrequent communication between wireless devices and a base station, for example.

In some cases, the wireless devices may be a delay-tolerant device. For example, a delay-tolerant device may be a device that is capable of operating for extended periods of time without communicating with another device and/or a base station. In some aspects, delay tolerance may be linked to a transmission cycle. In some embodiments, the wireless device is a UE with a long sleep cycle and/or an MTC device.

The methods, systems, and devices described may be used for transmission overload control and/or supervision of wireless devices that are in a connected state. A connected wireless device may be in RRC_CONNECTED state, for example. Situations may exist in which wireless devices are each kept in RRC_CONNECTED state throughout a session with a base station, even when the wireless devices are in a power-saving mode ("deep sleep"). An advantage to maintaining wireless devices in RRC_CONNECTED may be that there may be no need to establish connection every time the wireless device needs to "wake-up," which it may need to do to transmit or receive a signal. This may, however, present issues for a network having to cope with a large number of RRC_CONNECTED wireless devices. For example, a base station, such as an eNB, may need to maintain MTC device context data that is orders of magnitude greater than what the eNB would otherwise be required to maintain. Further, an eNB may need to schedule resources and manage Random Access Channel (RACH) messages for a large number of wireless devices. An eNB may need to manage the mobility state of a connected wireless device.

In a traditional LTE context, a discontinuous reception (DRX) cycle may be defined for user equipments (UEs), including MTC devices, in RRC_CONNECTED state. DRX typically involves a configurable cycle in which a UE monitors downlink control signaling during a specified subframe (DRX ON) and then "sleeps" (e.g., switches off receiver circuitry) during the remaining subframes (DRX OFF). Sleeping during the DRX OFF period may allow a UE to save power. Even in DRX, a UE could send an uplink Scheduling Request (SR) or RACH message anytime. An eNB may be obligated to respond to such an SR or RACH message. In a situation in which numerous UEs are in an RRC_CONNECTED state, even if sleeping, there could be a significant number of UEs that an eNB potentially has to schedule.

One solution may be to maintain wireless devices in RRC_IDLE and then restrict RACH messages for some period of time during overload conditions. This solution could, however, result in potentially long DRX ON periods with associated power consumption.

In some embodiments, a solution may be to maintain low duty cycle wireless devices in a discontinuous transmission (DTX) cycle for SR and/or a RACH transmissions or in a DTX cycle for all uplink signals. This may provide one example of a transmission overload control scheme. This transmission cycle may be staggered such that an eNB may only schedule a limited number of RRC_CONNECTED devices at any time. With this solution, the Physical Uplink Shared Channel (PUSCH) may not need to be regulated. In some cases, load throttling may be used if contention-based PUSCH is introduced. A solution employing both DRX and discontinuous transmission or DTX may be characterized such that the DRX cycle is sparser than the transmission or DTX cycle; or it may be characterized with a DRX cycle denser than a transmission or DTX cycle. In some embodiments, a DRX ON duration of a DRX cycle may coincide with a DTX ON duration of a DTX cycle. A DTX cycle may, for example, have a shorter period than a DRX cycle. In some cases, a DRX cycle may have a shorter period than a DTX cycle.

A transmission overload control scheme may be implemented in a variety of ways. For example, aspects of an implementation may involve an explicit SR and/or RACH occasion configuration in which wireless devices have staggered times when SR and/or RACH transmission is allowed. Aspects of an implementation may involve DTX for all uplink traffics, controlled with timers, e.g., dtxONtime and dtxINACTIVITYtimer, and associated rules governing transmissions. Aspects of some implementations may involve adding SR and/or RACH transmission periods to a DRX OFF restriction.

Tools and techniques also may be provided with regard to supervision schemes that may be implemented in a variety of ways. An MTC device, e.g., a meter or a sensor, may be configured with uplink (UL) semi-persistent scheduling (SPS), and such a device may rarely receive downlink (DL) unicast transmission. It is therefore possible that an eNB may prune a wireless device from its RRC_CONNECTED list. This pruning could occur for a number of reasons, including load control, inactivity, and/or radio link failure (RLF). This pruning may be transparent to a wireless device. It is thus possible that a wireless device may be transmitting but an eNB is not listening. If wireless devices are not able to avoid pruning (e.g., with a keep-alive technique) there may be undesirable outcomes, including a large number of transmitted packets lost, long times during which wireless devices are out-of-service, and/or jammed transmissions resulting from an eNB inadvertently scheduling over a resource dedicated to a wireless device.

These undesirable outcomes may be avoided if a wireless device runs a timer and/or a packet counter, for example. Such a timer may be reset after each handshake between a wireless device and an eNB. A timer may be an aspect of a wireless device or an aspect of an application layer. When a timer expires, a wireless device may initiate a keep-alive unicast handshake One example of a handshake may include a wireless device transmitting a message and receiving a response from an eNB. Another example of a handshake may include a wireless device receiving a message from an eNB and transmitting a response. Aspects of a handshake may involve a wireless device transmitting a RACH message, listening to an eNB for a response message, and replying with a closing message. Aspects of a handshake may involve sending an SR, listening for a UL grant, and replying in payload with a closing message. Such a procedure may be used for supervision of wireless devices or for eNB side supervision.

Undesirable pruning could be avoided with periodic broadcast messages from an eNB. An eNB may transmit to all wireless devices on a CONNECTED list. MTC devices may transmit a response indicating whether they should be on a CONNECTED list. A CONNECTED list may be reduced to only those wireless devices that did not have a unicast handshake recently. In some cases, a CONNECTED list may be transmitted in multiple broadcast messages aligned with wireless device DRX ON periods, and the list may include only wireless devices in the DRX ON period. Another list may be broadcast to, and include wireless devices on a staggered DRX ON period. In such a scenario, each list may be substantially smaller than a full CONNECTED list. Such a solution may provide UL and DL unicast transmission savings.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100 in accordance with various embodiments. The system 100 includes base stations (or cells) 105, wireless devices 115, and a core network 130. The base stations 105 may communicate with the wireless devices 115 under the control of a base station controller 120, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the wireless devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, pico, and/or femto base stations). There may be overlapping coverage areas for different technologies.

In some embodiments, the system 100 is an LTE/LTE-A network. In LTE/LTE-A networks, the terms evolved Node B or eNodeB (eNB) and user equipment (UE) may be generally used to describe the base stations 105 and wireless devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The wireless devices 115 are dispersed throughout the wireless network 100, and each wireless device may be stationary or mobile. A wireless device 115 may also be referred to by those skilled in the art as a UE, mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wireless local loop (WLL) station, an MTC device, or the like. A wireless device may be able to communicate with macro eNBs, pico eNBs, femto eNBs, relays, and the like.

The transmission links 125 shown in network 100 may include uplink (UL) transmissions from a wireless device 115 to a base station 105, and/or downlink (DL) transmissions, from a base station 105 to a mobile device 115. The downlink transmissions may also be called forward link transmissions while the uplink transmissions may also be called reverse link transmissions.

Some of the wireless devices 115 may be machine type communication (MTC) devices 115 that perform various functions, capture information, and/or communicate information with limited or no human intervention. For example, MTC devices 115 may include sensors and/or meters for monitoring and/or tracking other devices, environmental conditions, etc. MTC devices 115 may be standalone devices or, in embodiments, MTC devices 115 may be modules incorporated in other devices. For example, devices (e.g., user equipment, mobile stations, etc.) such as smart phones, cellular phones and wireless communications devices, personal digital assistants (PDAs), tablets, other handheld devices, netbooks, ultrabooks, smartbooks, notebook computers, surveillance cameras, handheld medical scanning devices, home appliances, etc. may include one or more MTC device modules 115. In the ensuing description, various techniques are described as applied to communications and processing for a system including a network and one or more MTC devices. It should be understood that the described techniques may be advantageously applied to other devices such as those incorporating MTC devices and/or other wireless devices. For example, the wireless devices 115 may be UEs that may have long sleep cycles and/or MTC devices, including ultra-low power MTC devices. In some aspects, the wireless devices 115 may be or include delay-tolerant devices.

The information collected by the MTC wireless devices 115 may be transmitted across a network that includes components of system 100 to a back-end system, such as a server. The transmission of data to/from the MTC devices 115 may be routed through the base stations 105. The base stations 105 may communicate with the MTC devices 115 on a forward link for transmitting signaling and/or information to the MTC devices 115 and on a reverse link for receiving signaling and/or information from the MTC devices 115.

In one example, the network controller 120 may be coupled to a set of base stations and provide coordination and control for these base stations 105. The controller 120 may communicate with the base stations 105 via a backhaul (e.g., core network 130). The base stations 105 may also communicate with one another directly or indirectly and/or via wireless or wireline backhaul.

The different aspects of system 100, such as the wireless devices 115, the base stations 105, the core network 130, and/or the controller 120 may be configured for transmission overload control and/or supervision of different wireless devices 115 with deep sleep cycles, in RRC_CONNECTED state. In some cases, the wireless devices 115 may include ultra-low power MTC devices. For example, aspects of the wireless devices 115 may be configured for identifying a transmission cycle for an uplink channel. The transmission cycle may be discontinuous. The wireless devices 115 may transmit SR and/or RACH messages, and/or other signals or data, according to an identified transmission cycle. In some cases, one or more eNBs 105 may be configured to establish and broadcast, or otherwise send, one or more transmission cycles to the wireless devices 115. Aspects of the system 100 may include supervision of the wireless devices 115, which may include a wireless device 115 sending a keep-alive message to an eNB 105 at set intervals in order to avoid pruning. In some cases, an eNB 105 may be configured to broadcast a list of connected devices, to which the wireless devices 115 may respond in order to avoid pruning.

Figure 2:
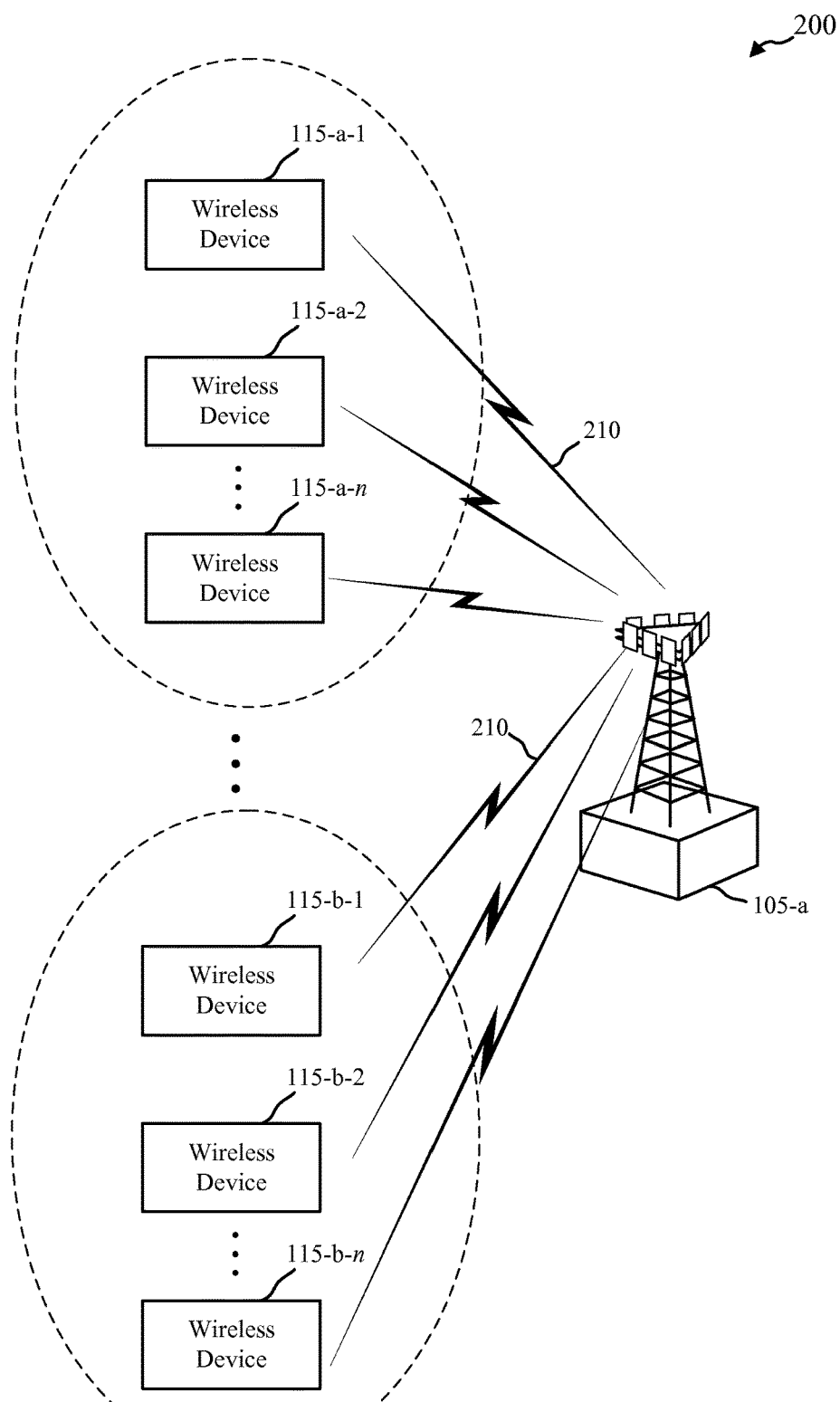
FIG. 2 shows a diagram of a wireless communications system according to some embodiments.

FIG. 2 illustrates an example of a wireless communications system 200 implementing a machine type communication service over an LTE/LTE-Advanced network in accordance with various embodiments. The system 200 may be an example of aspects of system 100. The system 200 may be implemented to maintain low duty cycle MTC devices in a discontinuous transmission cycle for SR and/or RACH or in a discontinuous transmission (DTX) cycle for all uplink signals. This transmission cycle may be staggered such that an eNB may only schedule a limited number of RRC_CONNECTED devices at any time. The system 200 may include a number of wireless devices 115-a and 115-b, and an eNB 105-a. The eNB 105-a may be an example of the base stations illustrated in FIG. 1. The wireless devices 115-a may be examples of the wireless devices 115 illustrated in FIG. 1. The eNB 105-a may determine and transmit 210 information regarding transmission cycles for the wireless devices 115-a and 115-b. The wireless devices 115-a and 115-b may identify a transmission cycle for an uplink channel, and the wireless devices 115-a and 115-b may identify an off cycle with respect to the transmission cycle. The transmission cycle for the wireless devices 115-a may be different from the transmission cycle for the wireless devices 115-b; and one or both cycles may be discontinuous. The wireless devices 115-a and 115-b may transmit according to an identified transmission cycle, and the wireless devices 115-a and 115-b may refrain from transmitting during the off cycle. One skilled in the art would understand that the quantity of wireless devices 115-a, eNBs 105-a, and communications 210 shown in FIG. 2 is for illustration purposes only and should not be construed as limiting. The wireless devices 115-a may be a delay-tolerant device. In some embodiments, the wireless devices 115-a may include UEs with a long sleep cycle and/or MTC devices.

The wireless communications system 200 may be operable to facilitate machine type communication between one or more MTC devices 115-a and/or one or more eNBs 105-a. Machine type communication may include communications between one or more devices without human intervention. In one example, machine type communication may include the automated exchange of data between a remote machine, such as a wireless device 115-a, and a back-end IT infrastructure without user intervention. The transfer of data from a wireless device 115-a to a server, another wireless device 115-b, or the eNB 105-a may be performed using reverse link communications. Data collected by the wireless devices 115-a or 115-b (e.g., monitoring data, sensor data, meter data, etc.) may be transferred on the reverse link communications. The wireless devices 115-a and 115-b may be on staggered transmission cycles such that the wireless devices 115-a transmit according to one cycle, during which the wireless devices 115-b may not transmit. Likewise, the wireless devices 115-b may transmit according to a separate cycle, during which the wireless devices 115-a may not transmit. In this way, each of the wireless devices 115-a and 115-b may remain in RRC_CONNECTED state, but the eNB 105-a may be able to effectively schedule resources and coordinate RACH processes because the number of MTC devices that may transmit at a given time may be limited.

The transfer of data to wireless device 115-a or 115-b via the eNB 105-a may be performed via forward link (e.g., downlink) communications. The forward link may be used to send instructions, software/firmware updates, and/or messages to the wireless devices 115-a or 115-b. The instructions may instruct the wireless devices 115-a or 115-b to remotely monitor equipment, environmental conditions, etc. Machine type communication (MTC) may be used with various applications such as, but not limited to, remote monitoring, measurement and condition recording, fleet management and asset tracking, in-field data collection, distribution, physical access control, and/or storage, etc. The eNB 105-a may generate one or more forward link frames with a small number of channels to transmit instructions, software/firmware updates, and/or messages. The various wireless devices 115-a and/or 115-b may operate according to a DRX cycle, and they may wake up (e.g., power on) to monitor a specific frame when instructions or other data is included on a channel of that frame. In some embodiments, aspects of the wireless devices 115-a and/or 115-b may transmit according to a DRX cycle mask, which may allow the wireless devices 115-a and/or 115-b to refrain from receiving during DRX OFF periods.

In some embodiments, the behavior of the wireless devices 115-a and/or 115-b may be pre-defined. For example, the day, time, etc. to monitor another device and transmit the collected information may be pre-defined for a wireless device 115-a. In some embodiments, the wireless device 115-a-1 may be an MTC device and may be programmed to begin monitoring another device and collect information about that other device at a first pre-defined time period. The wireless device 115-a-1 may also be programmed to transmit the collected information at a second pre-defined time period. The determined transmission cycle may account for or may be based on a predefined monitoring time.

Figure 3A:
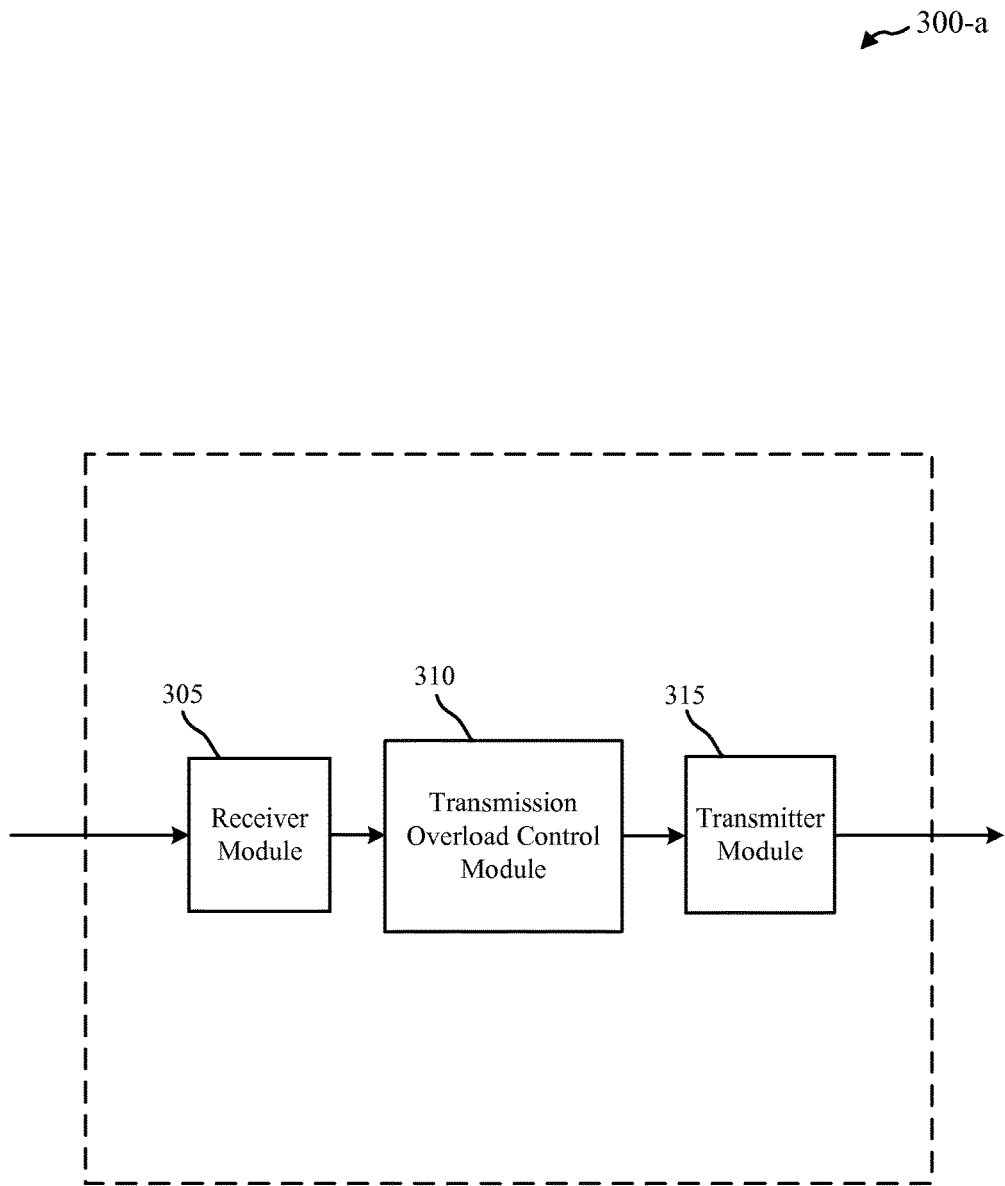
FIGS. 3A, 3B, and 3C show diagrams of a device or devices in a wireless communications system according to some embodiments.
Figure 3B:
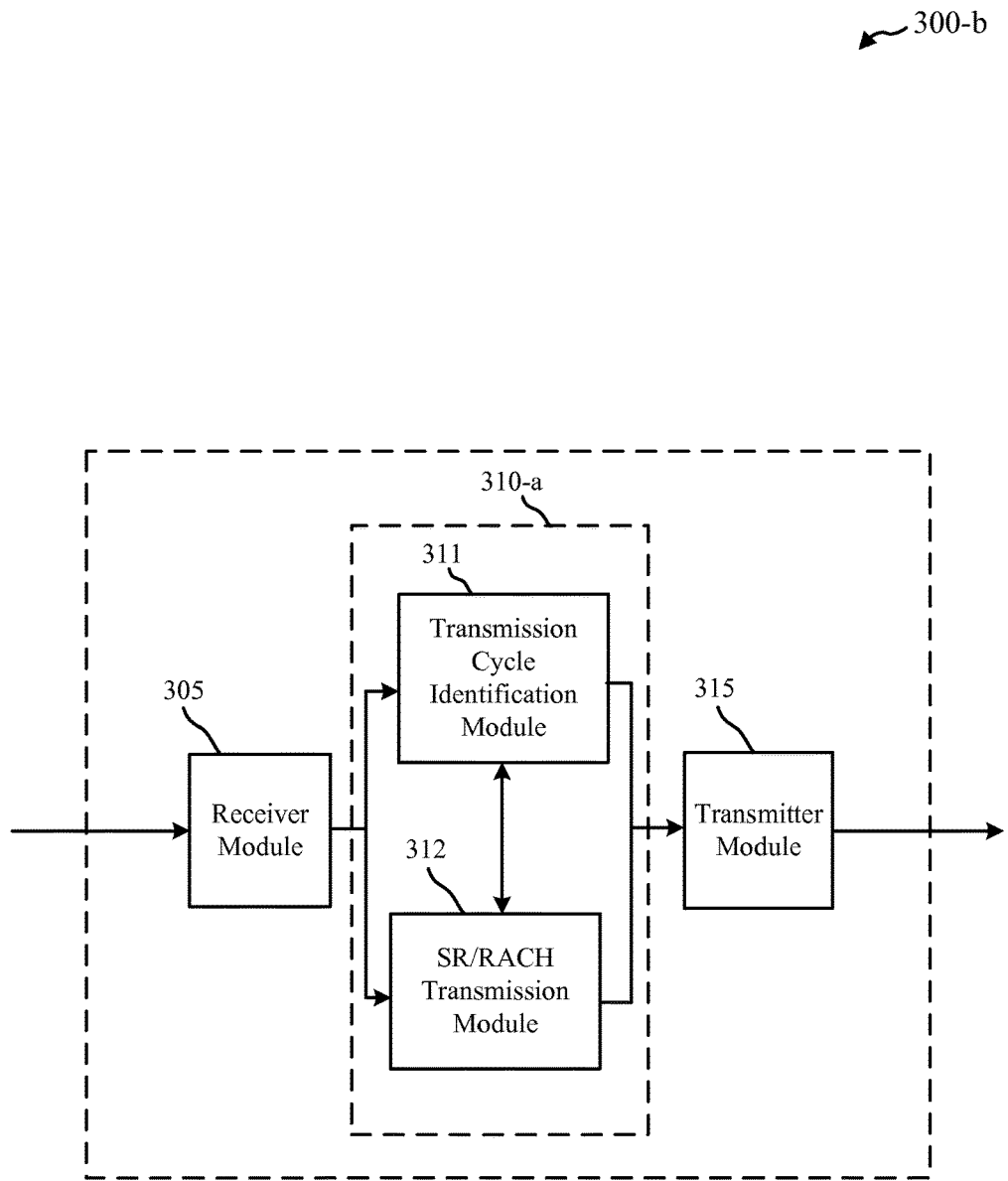
Figure 3C:
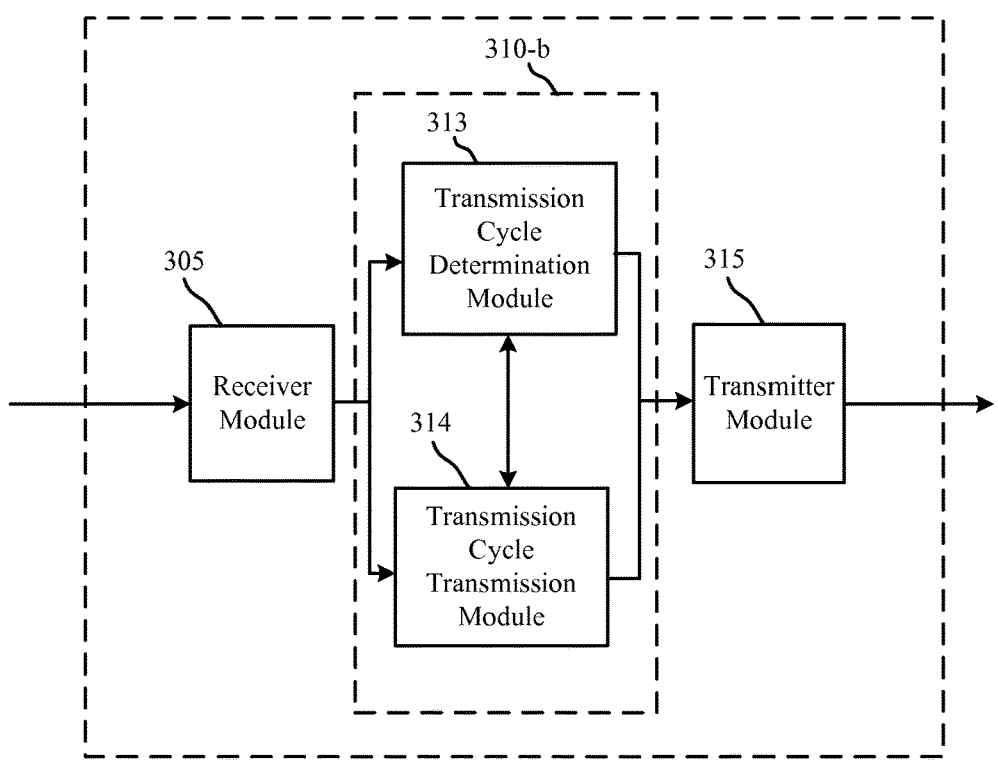

Turning next to FIGS. 3A, 3B, and 3C, block diagrams illustrate devices 300-a, 300-b, and/or 300-c for transmission overload control of a wireless device in accordance with various embodiments. The devices 300-a, 300-b, and/or 300-c may be examples of one or more aspects of base stations 105 and/or wireless devices 115 described with reference to FIGS. 1 and 2. The wireless devices 115 may be delay-tolerant devices, for example. In some embodiments, the wireless devices 115 may be UEs with a long sleep cycle and/or MTC devices. The devices 300-a, 300-b, and/or 300-c may also be processors. The device 300-a may include a receiver module 305, a transmission overload control module 310, and/or a transmitter module 315. The device 300-b may include a receiver module 305, a transmission overload control module 310-a, and/or a transmitter module 315. The device 300-c may include a receiver module 305, a transmission overload control module 310-b, and/or a transmitter module 315. Each of these components may be in communication with each other. Each of the components of each device may be in communication with other components of the device.

These components of the devices 300-a, 300-b, and/or 300-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory or other non-transitory computer-readable medium, formatted to be executed by one or more general or application-specific processors.

The receiver module 305 in FIGS. 3A, 3B, and 3C may receive information such as packet, data, and/or signaling information, including information related to a transmission cycle, regarding what the device 300-a has received or transmitted. The received information may be utilized by the transmission overload control module 310 for a variety of purposes. For example, the received information may be utilized for transmission cycle determination by a wireless device 115.

The receiver module 305 may be configured to receive a reverse link (e g, uplink) physical layer packet sent from a wireless device 115 using reverse link communications. The receiver module 305 may also be configured to receive instructions, transmission cycle information, a set of operations, messages, etc. from an eNB 105.

The transmission overload control module 310 may determine a transmission cycle and initiate transmission during designated transmission periods. The transmission overload control modules 310-a and 310-b of devices 300-b and 300-c, shown in FIGS. 3B and 3C, may be examples of aspects of transmission overload control module 310. In some examples, modules 310-a and 310-b include submodules of the transmission overload control module 310. The transmission overload control module 310-a, shown in FIG. 3B, may include a transmission cycle identification module 311 and the SR/RACH transmission module 312. In some embodiments, the transmission cycle identification modules 311 may process and/or identify information from an eNB 105 regarding a designated transmission cycle, DTX, and/or DRX. In some embodiments, the SR/RACH transmission module 312 may initiate transmission of an SR, RACH message, and/or other uplink transmissions according to the identified transmission cycle or DTX. Additionally or alternatively, the SR/Transmission module 312 may cause the device 300-b to refrain from transmitting an SR and/or RACH message. The transmission overload control module 310-b, shown in FIG. 3C, may include the transmission cycle determination module 313 and the transmission cycle transmission module 314. In some embodiments, the transmission cycle determination module 313 may determine and/or establish a transmission cycle and/or an off cycle for one or more wireless devices 115. In some embodiments, the transmission cycle transmission module 314 may initiate or facilitate communicating the determined transmission cycle and/or off cycle to one or more wireless devices 115.

In some embodiments, the transmitter module 315 may transmit an SR, RACH message, and/or other uplink transmissions according to an identified transmission cycle. In some embodiments, the transmitter module 315 may transmit downlink transmissions, including, for example, a transmission cycle to one or more wireless devices 115.

Figure 4A:
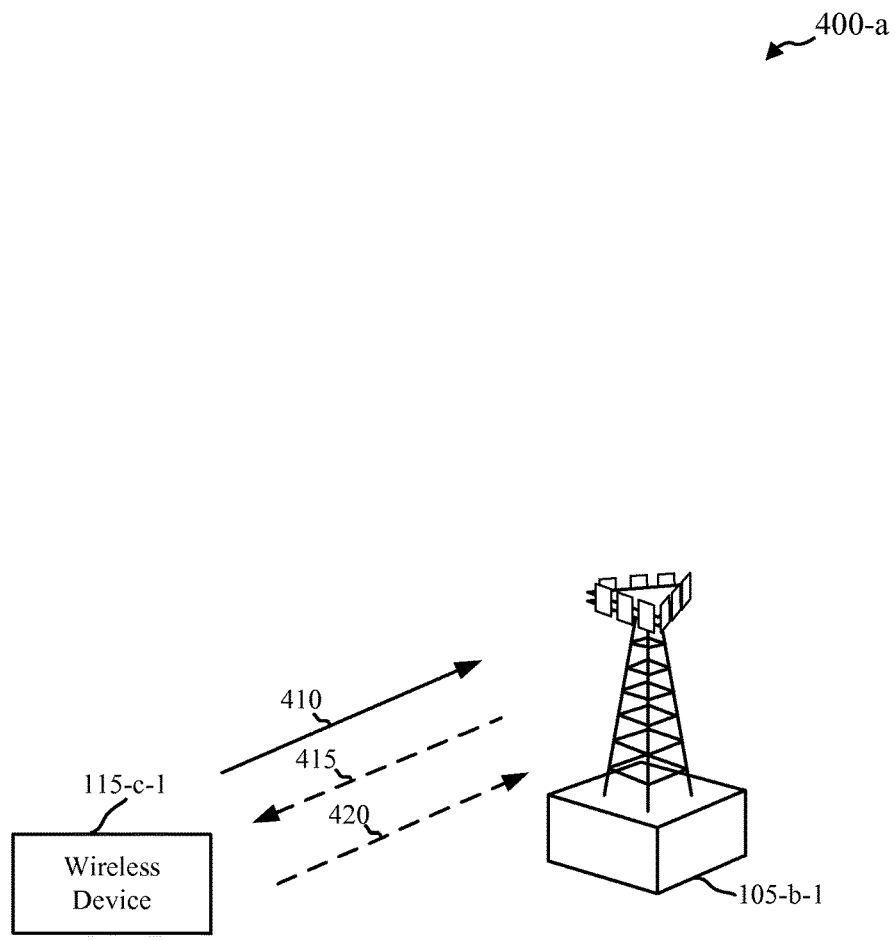
FIGS. 4A and 4B show diagrams of a wireless communications system according to some embodiments.
Figure 4B:
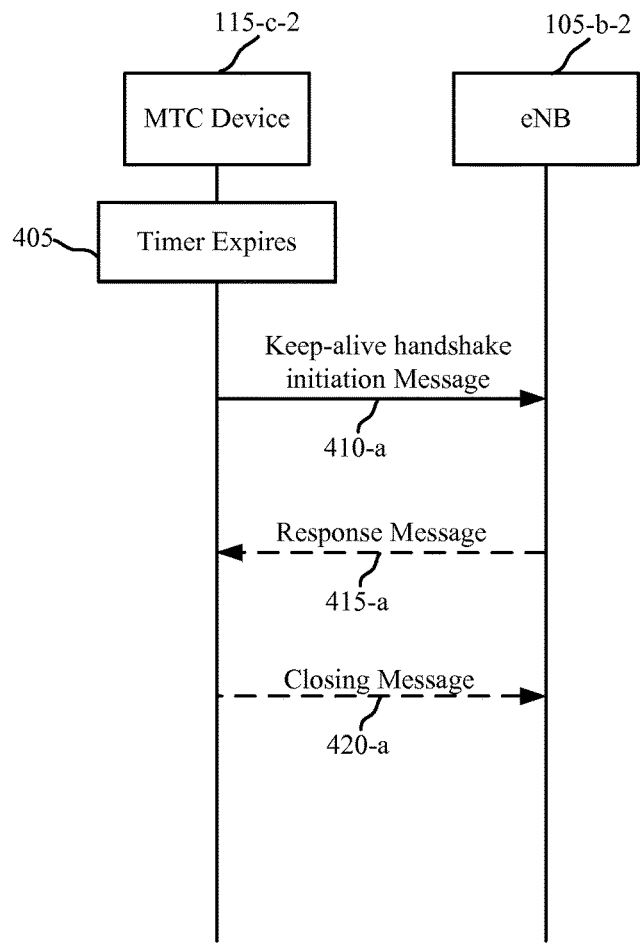

FIGS. 4A and 4B illustrate examples of systems 400-a and 400-b implementing machine type communication supervision procedures in accordance with various embodiments. The systems 400-a and 400-b may be examples of aspects of the system 100 in FIG. 1. Possible issues associated with infrequent communication between a wireless device and an eNB may potentially be avoided if a wireless device runs a timer. Such a timer may be reset after each handshake between a wireless device and an eNB. A timer may be an aspect of, for example, a wireless device 115, which may be an MTC device. When a timer expires, a wireless device may initiate a keep-alive handshake Such a procedure may be used for supervision of wireless devices or for eNB side supervision. The system 400-a may include a wireless device 115-c-1 and an eNB 105-b-1. The eNB 105-b-1 may be an example of the base stations illustrated in FIG. 1. The wireless devices 115-c-1 may be examples of the wireless devices 115 illustrated in FIG. 1. A timer may be initiated at the wireless device 115-c-1 after a handshake between the wireless device 115-c-1 and the eNB 105-b-1. A timer may be initiated by the wireless device 115-c-1. The wireless device 115-c-1 may transmit a keep-alive handshake initiation message 410 to the eNB 105-b-1 upon expiration of a timer. The keep-alive handshake initiation message 410 may be a RACH message. Alternatively, the keep-alive handshake initiation message 410 may include an SR. In response to the keep-alive handshake initiation message 410, the eNB 105-b-1 may transmit a response 415. A response 415 may be a RACH message or an UL grant. The wireless device 115-c-1 may transmit a reply 420. A reply 420 may be a closing message. A reply 420 may include a RACH message or a payload with a closing message. In some embodiments, the wireless devices 115-c-1 may be UEs that may have long sleep cycles and/or MTC devices, including ultra-low power MTC devices. In some cases, the wireless devices 115-c-1 may involve delay-tolerant devices.

The system 400-b may include an MTC device 115-c-2 and an eNB 105-b-2. The eNB 105-b-2 may be an example of the base station 105-b-1 illustrated in FIG. 4A. The MTC device 115-c-2 may be an example of a wireless device 115-c-1 illustrated in FIG. 4A. The MTC device 115-c-2 may initiate a timer. When the timer expires 405, the MTC device 115-c-2 may transmit a keep-alive handshake initiation message 410-a. In response, the eNB 105-b-2 may transmit a response message 415-a. In reply, the MTC device 115-c-2 may transmit a closing message 420-a. Although discussed in terms of an MTC device, device 115-c-2 may, in some embodiments, be a UE that having a long sleep cycle. Device 115-c-2 may be an ultra-low power MTC. In some aspects, device 115-c-2 may include delay-tolerant features such that it may be capable of operating for extended time periods without transmitting or receiving a signal.

Figure 5A:
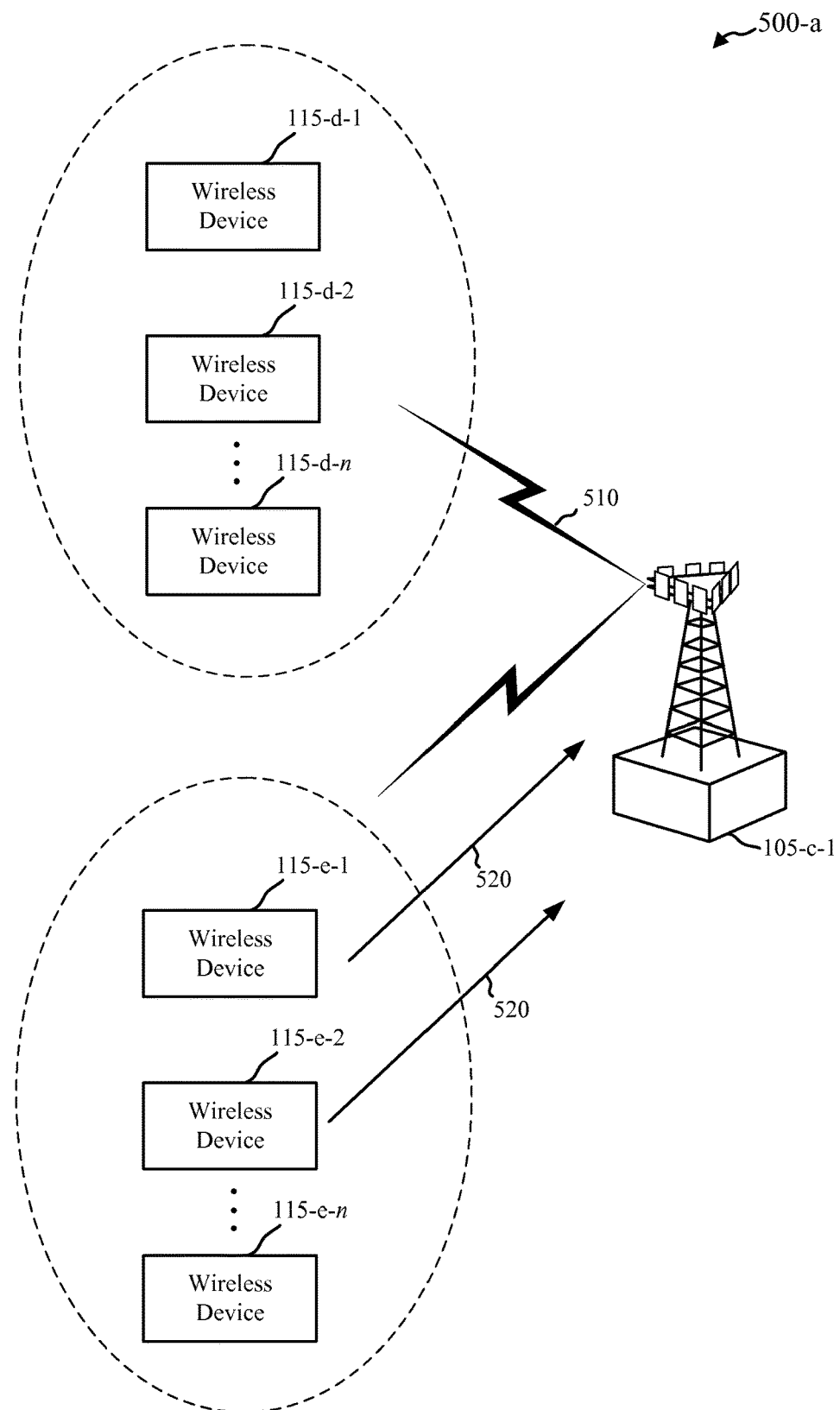
FIGS. 5A and 5B show diagrams of a wireless communications system according to some embodiments.
Figure 5B:
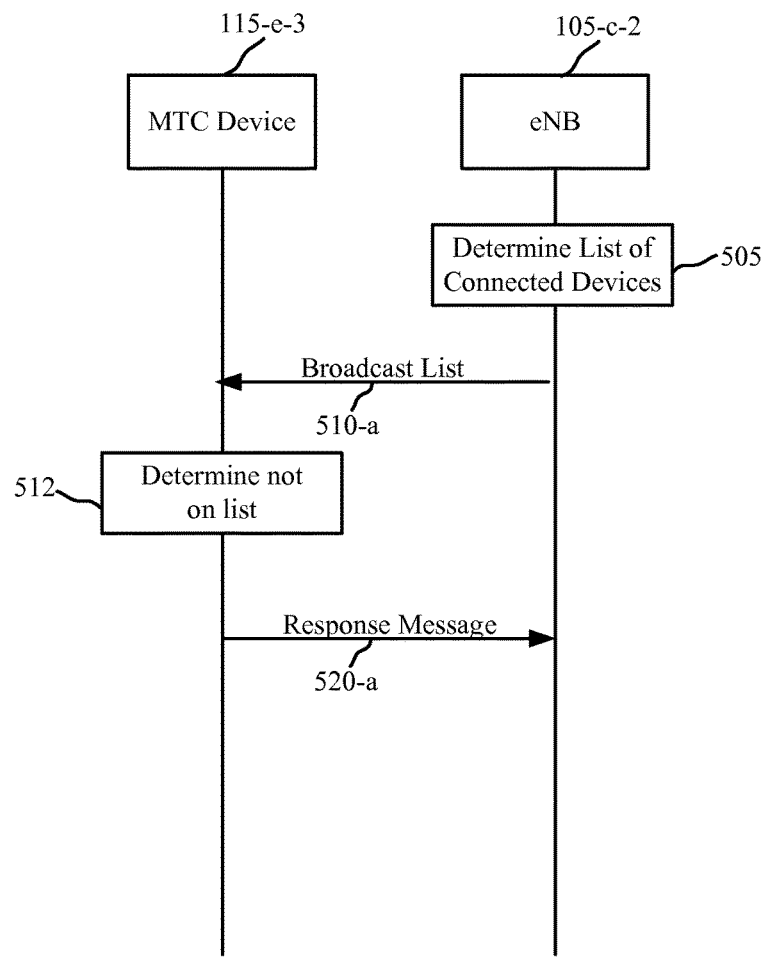

FIGS. 5A and 5B illustrate examples of wireless communication systems 500-a and 500-b implementing wireless device supervision procedures in accordance with various embodiments. The systems 500-a and 500-b may be examples of aspects of the system 100 in FIG. 1. An eNB may transmit to all wireless devices on a CONNECTED list to, for example, ascertain which devices may be actually connected and which may be candidates for pruning. Wireless devices may transmit a response indicating whether they should be on a CONNECTED list. The system 500-a may include wireless devices 115-d and 115-e and an eNB 105-c-1. The eNB 105-c-1 may be an example of the base stations illustrated in FIG. 1. The wireless devices 115-d and 115-e may be examples of the wireless devices 115 illustrated in FIG. 1. The eNB 105-c-1 may determine a list of connected devices, which may include wireless devices 115-d and/or 115-e. The eNB 105-c-1 may broadcast 510 one or more messages that include or corresponds to a list of connected devices. The wireless devices 115-d and/or 115-e may receive a broadcast 510 including a list of connected devices. The wireless devices 115-d and/or 115-e may determine whether they are on the list of connected devices. Whether the wireless devices 115-d and/or 115-e are on the list of connected devices may be a function of whether the wireless devices 115-d and/or 115-e have transmitted a keep-alive handshake initiation message or engaged in a handshake with the eNB 105-c-1 within a designated time period. The wireless devices 115-d and/or 115-e may transmit a message 520 indicating that the wireless devices 115-d and/or 115-e are not on the list of connected devices, but that the wireless devices 115-d and 115-e are connected to the eNB 105-c-1 and should be on the list. The eNB 105-c-1 may receive the message 520 from the wireless devices 115-d and/or 115-e that those devices are not, but should be, on a list of connected devices. In some embodiments, the wireless devices 115-d and/or 115-e may be UEs that may have long sleep cycles. In some embodiments, the wireless devices 115-d and/or 115-e may be MTC devices, including ultra-low power MTC devices. In some cases, the wireless devices 115-d and/or 115-e may be or involve delay-tolerant devices.

The system 500-b may include an MTC device 115-e-3 and an eNB 105-c-2. The eNB 105-c-2 may be an example of the base station 105-c-1 illustrated in FIG. 5A. The MTC device 115-e-3 may be an example of a wireless device 115 illustrated in FIG. 5A, which is connected to the eNB 105-c-2. The eNB 105-c-2 may determine 505 a list of connected devices. The eNB 105-c-2 may broadcast 510-a a list of connected devices. A broadcast 510-a may include transmitting more than one message based on a DRX cycle such that each message includes a subset of devices from the list of connected devices. The MTC device 115-e-3 may receive the broadcast 510-a and/or determine 512 that it is not on the list of connected devices. The MTC device 115-e-3 may transmit a response message 520-a to the eNB 105-c-2 that the MTC device 115-e-3 should be on the list of connected devices. Although discussed in terms of an MTC device, device 115-e-3 may, in some embodiments, be a UE that may have a long sleep cycle. Device 115-e-3 may be an ultra-low power MTC. In some aspects, device 115-e-3 may include delay-tolerant features such that it may be capable of operating for extended time periods without transmitting or receiving a signal.

Figure 6A:
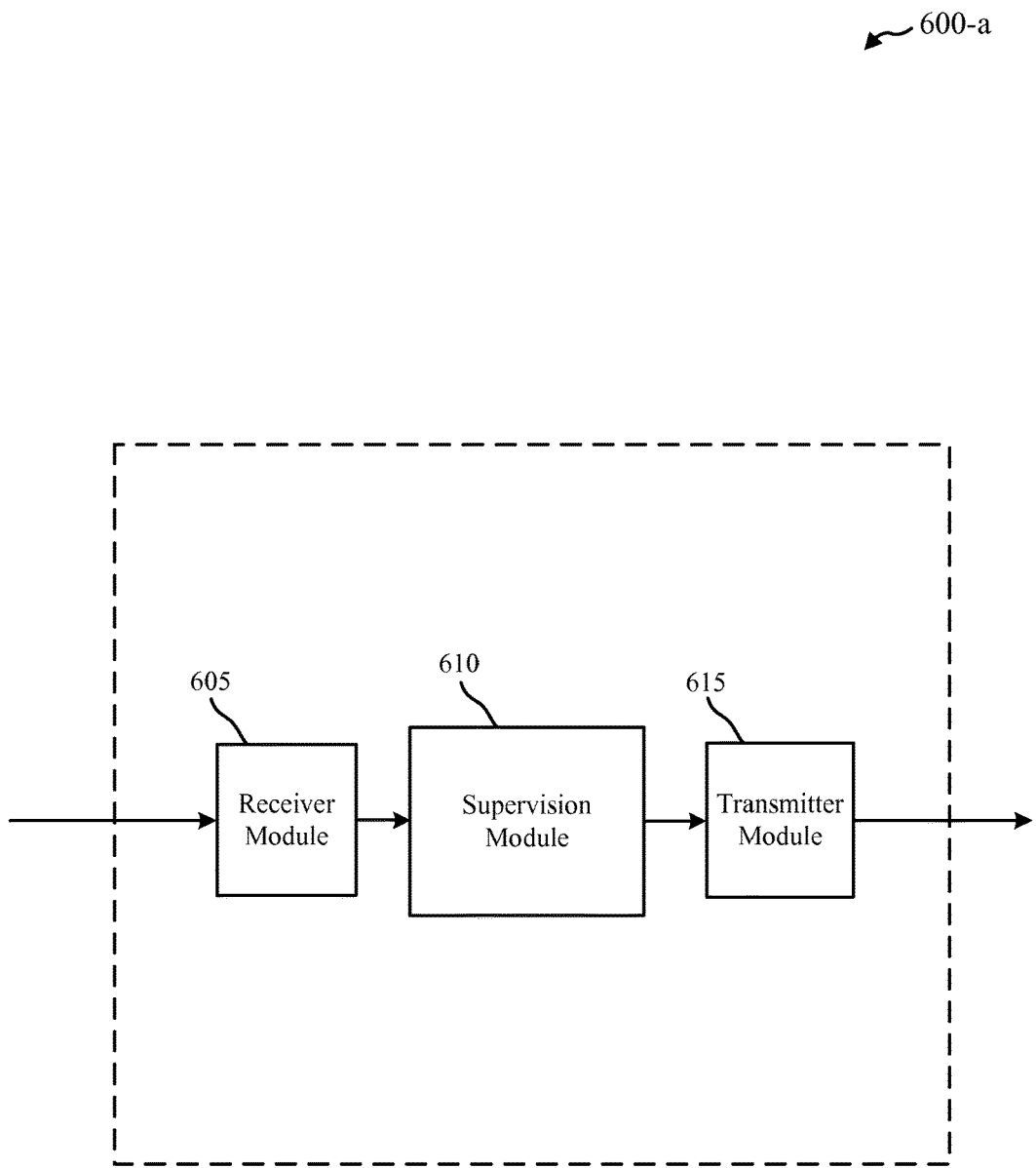
FIGS. 6A, 6B, and 6C show diagrams of a device or devices in a wireless communications system according to some embodiments.
Figure 6B:
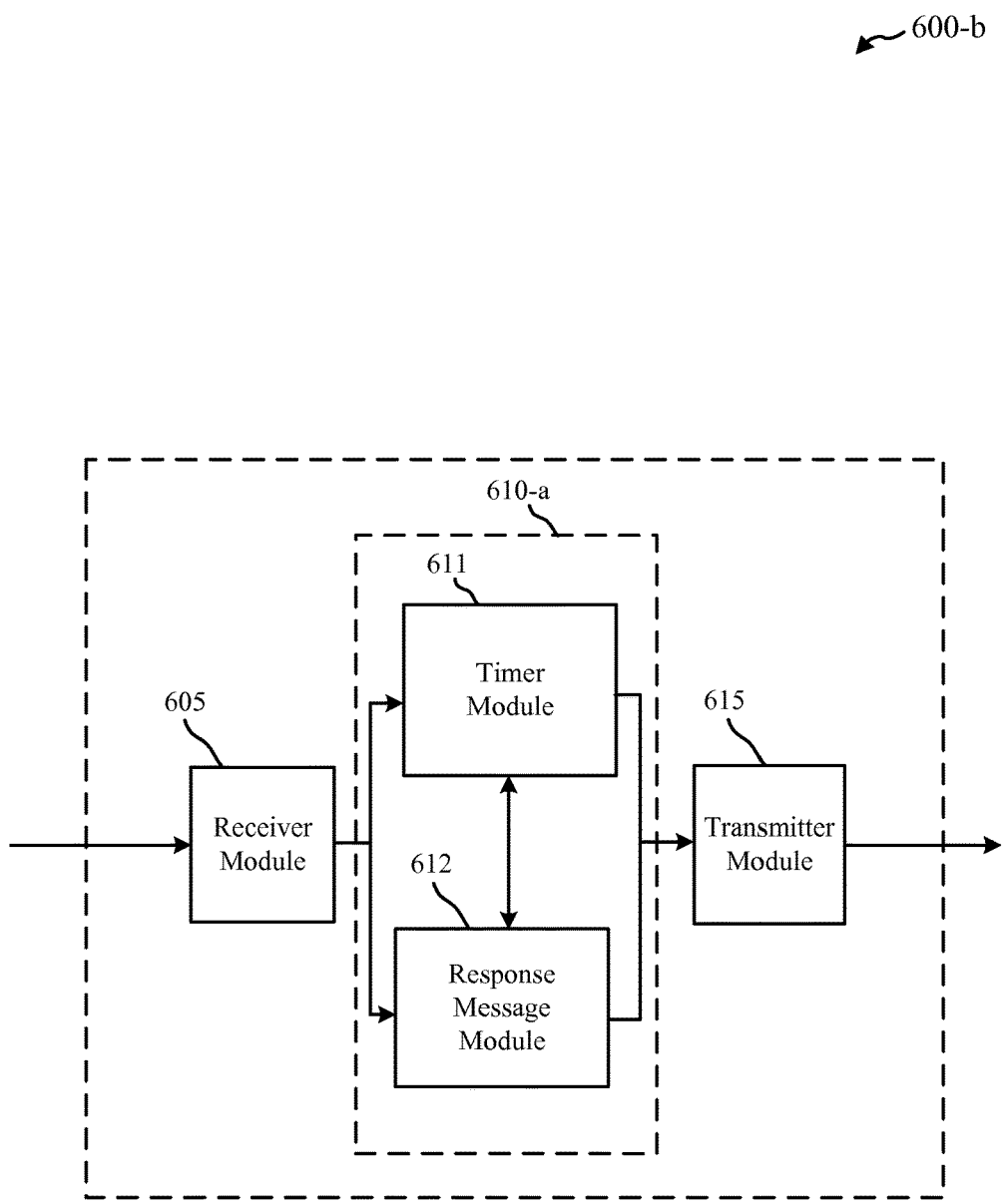
Figure 6C:
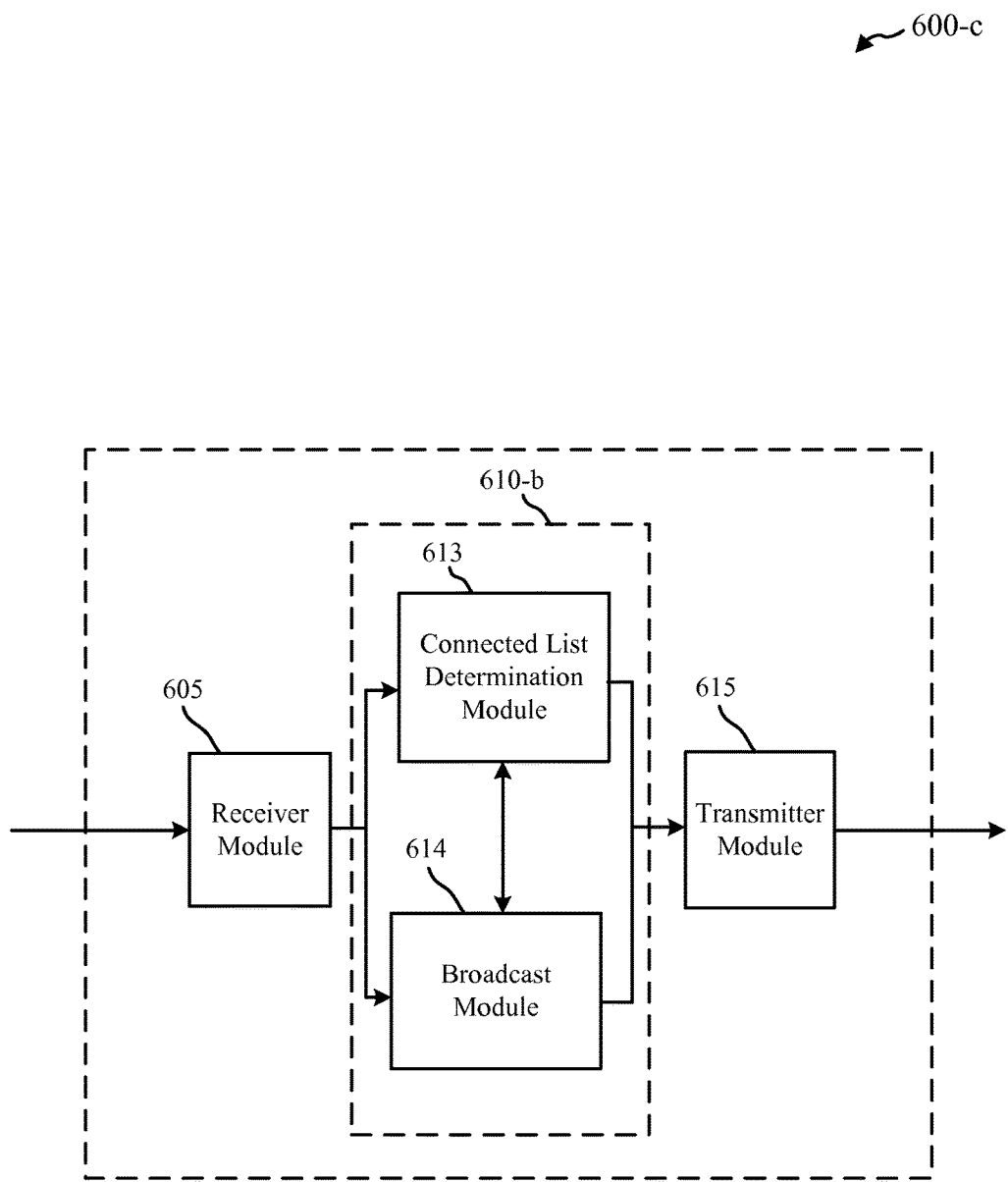

Turning next to FIGS. 6A, 6B, and 6C, block diagrams illustrate devices 600-a, 600-b, and/or 600-c for supervision of a wireless device in accordance with various embodiments. The devices 600-a, 600-b, and/or 600-c may be examples of one or more aspects of base stations 105 and/or wireless devices 115 described with reference to FIGS. 1, 2, 4A, 4B, 5A, and 5B. The devices 600-a, 600-b, and/or 600-c may also be processors. The device 600-a may include a receiver module 605, a supervision module 610, and/or a transmitter module 615. The device 600-b may include a receiver module 605, a supervision module 610-a, and or a transmitter module 615. The device 600-c may include a receiver module 605, a supervision module 610-b, and/or a transmitter module 615. Each of the components of each device may be in communication with other components of the device.

These components of the devices 600-a, 600-b, and/or 600-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory or other non-transitory computer-readable medium, formatted to be executed by one or more general or application-specific processors.

The receiver module 605 in FIGS. 6A, 6B, and/or 6C may receive information such as packet, data, and/or signaling information, including information related to a transmission cycle, regarding what the device 600-a has received or transmitted. The received information may be utilized by the supervision module 610 for a variety of purposes. For example, the received information may be utilized for transmission cycle determination by an eNB 105.

The receiver module 605 may be configured to receive a reverse link (e.g., uplink) physical layer packet sent from a wireless device 115 using reverse link communications. The receiver module 605 may also be configured to receive instructions, transmission cycle information, a set of operations, messages, etc. from a wireless device 115 or an eNB 105.

The supervision module 610 may initiate a timer and/or a keep-alive message. The supervision module 610 may facilitate listening to, processing, and/or replying to messages from an eNB 105. The supervision module 610 may determine a list of connected devices and initiate a broadcast transmission. The supervision module 610 may facilitate pruning of wireless devices 115 from a list of connected devices. The supervision module 610 may facilitate listening to, processing, and/or replying to messages from an MTC device 115. The supervision modules 610-a and 610-b of devices 600-b and 600-c, shown respectively in FIGS. 6B and 6C, may be examples of aspects of the supervision module 610. In some examples, modules 610-a and 610-b include submodules of the supervision module 610.

The supervision modules 610-a may include a timer module 611 and a response message module 612. The timer module 611 may initiate a timer after a handshake between an MTC device 115 and an eNB 105. The timer module 611 may reset a timer after a handshake between a wireless device 115 and an eNB 105. The response message module 612 may facilitate transmission of a keep-alive handshake initiation message. The response message module 612 may facilitate transmission of an SR and/or RACH message. The supervision module 610-b may include a connected list determination module 613 and a broadcast module 614. The connected list determination module 613 may determine a list of wireless devices 115 connected to an eNB 105. The broadcast module 614 may facilitate broadcasting of one or more messages that may include a list of wireless devices 115 connected to an eNB 105. The connected list determination module 613 may facilitate processing a response message from a wireless device 115 regarding the connected status of the wireless device 115.

The transmitter module 615 may transmit an SR, RACH message, and/or other uplink and or downlink transmission according to an identified and/or determined transmission, DTX, and/or DRX cycle.

Figure 7:
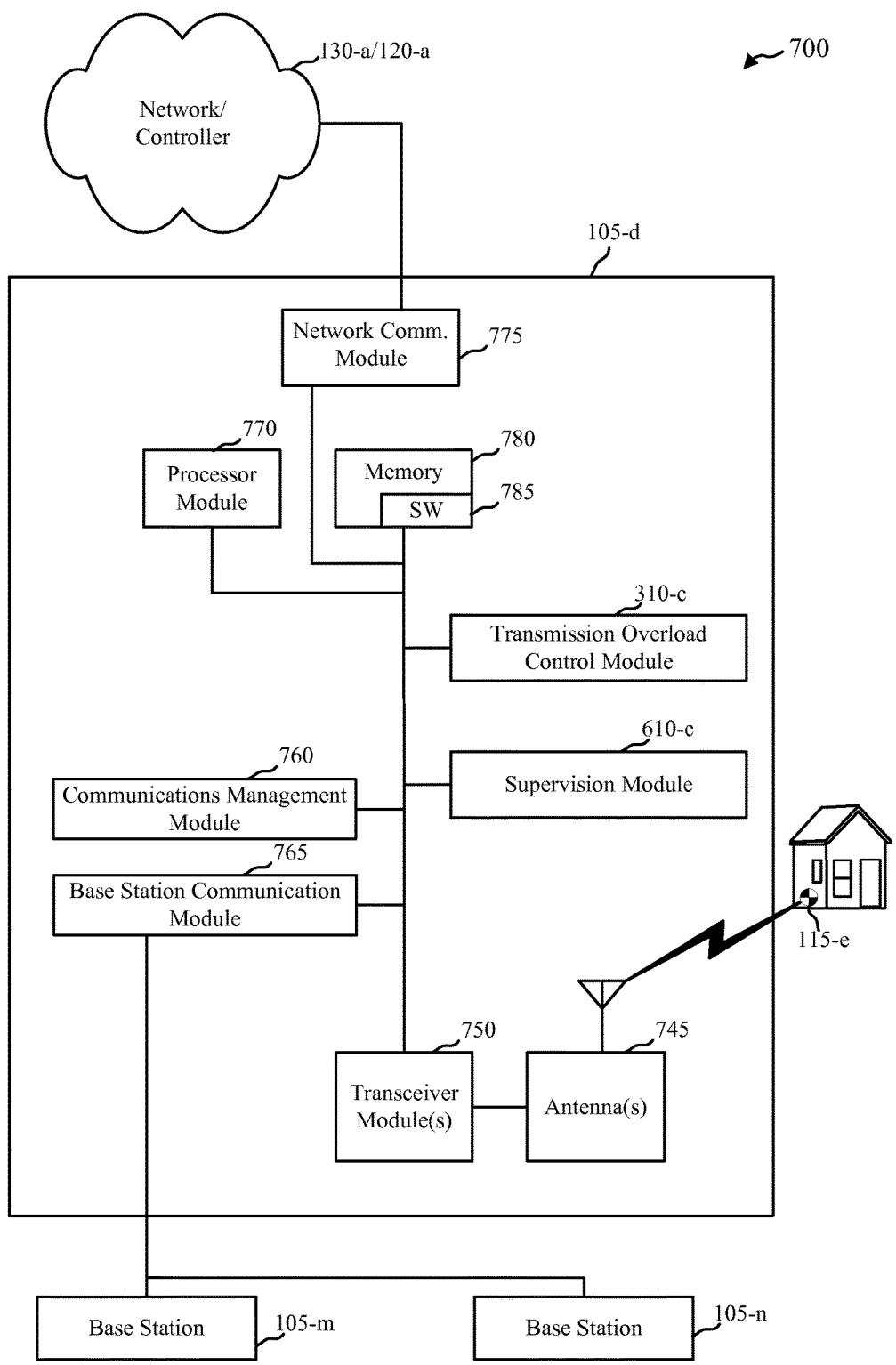
FIG. 7 shows a diagram of a wireless communications system according to some embodiments.

FIG. 7 shows a block diagram of a communications system 700 that may be configured for transmission overload control and/or supervision of wireless devices 115. This system 700 may be an example of aspects of the system 100 depicted in FIG. 1, system 200 of FIG. 2, device 300-a of FIG. 3A, system 400-a of FIG. 4A, system 500-a of FIG. 5A, and or device 600-a of FIG. 6A. System 700 may include a base station 105-d. The base station 105-d may include antenna(s) 745, a transceiver module 750, memory 780, and a processor module 770, which each may be in communication, directly or indirectly, with each other (e.g., over one or more buses). The transceiver module 750 may be configured to communicate bi-directionally, via the antenna(s) 745, with a wireless device 115-e. Alternatively or in addition, the transceiver module 750 may be configured to communicate with one or more UEs that may have a long sleep cycle. The transceiver module 750 may be configured to communicate with an MTC device, which may be an ultra-low power MTC device. In some aspects, the transceiver module 750 may be capable of communicating with delay-tolerant devices, which themselves may be capable of operating for extended time periods without transmitting or receiving a signal. The transceiver module 750 (and/or other components of the base station 105-d) may also be configured to communicate bi-directionally with one or more networks. In some cases, the base station 105-d may communicate with the core network 130-a and/or the controller 120-a through network communications module 775. The base station 105-d may be an example of an eNodeB base station, a Home eNodeB base station, a NodeB base station, and/or a Home NodeB base station. Controller 120-a may be integrated into base station 105-d in some cases, such as with an eNodeB base station.

Base station 105-d may also communicate with other base stations 105, such as base station 105-m and base station 105-n. Each of the base stations 105 may communicate with the wireless device 115-e using different wireless communications technologies, such as different Radio Access Technologies. Base station 105-d may perform and/or facilitate transmission overload control of one or more wireless devices using transmission overload control module 310-c. Base station 105-d may perform and/or facilitate supervision using supervision module 610-c. Transmission overload control and supervision may include determining, identifying, transmitting, and receiving according to a transmission cycle, DTX, and/or DRX. In some cases, base station 105-d may communicate with other base stations such as 105-m and/or 105-n utilizing base station communication module 765. In some embodiments, base station communication module 765 may provide an X2 interface within an LTE wireless communication technology to provide communication between some of the base stations 105. In some embodiments, base station 105-d may communicate with other base stations through controller 120-a and/or core network 130-a.

The memory 780 may include random access memory (RAM) and read-only memory (ROM). The memory 780 may also store computer-readable, computer-executable software code 785 containing instructions that are configured to, when executed, cause the processor module 770 to perform various functions described herein (e.g., transmission overload control, supervision, keep-alive messaging, pruning, etc.). Alternatively, the software code 785 may not be directly executable by the processor module 770 but be configured to cause the computer, e.g., when compiled and executed, to perform functions described herein.

The processor module 770 may include an intelligent hardware device, e.g., a central processing unit (CPU) such as those made by Intel® Corporation or AMD®, a microcontroller, an application-specific integrated circuit (ASIC), etc. The processor module 770 may include a speech encoder (not shown) configured to receive audio via a microphone, convert the audio into packets (e.g., 30 ms in length, etc.) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking.

The transceiver module 750 may include a modem configured to modulate the packets and provide the modulated packets to the antenna(s) 745 for transmission, and to demodulate packets received from the antenna(s) 745. While some examples of the base station 105-d may include a single antenna 745, the base station 105-d preferably includes multiple antennas 745 for multiple links which may support carrier aggregation. For example, one or more links may be used to support macro communications with the wireless device 115-e.

According to the architecture of FIG. 7, the base station 105-d may further include a communications management module 760. The communications management module 760 may manage communications with other base stations 105-m or 105-n. By way of example, the communications management module 760 may be a component of the base station 105-d in communication with some or all of the other components of the base station 105-d via a bus. Alternatively, functionality of the communications management module 760 may be implemented as a component of the transceiver module 750, as a computer program product or aspects of a non-transitory computer-readable storage medium, and/or as one or more controller elements of the processor module 770.

The components for base station 105-d may be configured to implement overload control and supervision techniques discussed above with respect to devices 300-a, 300-b, 300-c, 600-a, 600-b, and/or 600-c, of FIGS. 3A, 3B, 3C, 6A, 6B, and/or 6C, respectively, and may not be repeated here for the sake of brevity. For example, the transmission overload control module 310-c may include similar functionality as the transmission overload control module 310, 310-a, and/or 310-b of FIGS. 3A, 3B, and 3C, respectively. As another example, the supervision module 610-c may include similar functionality as the supervision module 610, 610-a, and/or 610-b of FIGS. 6A, 6B, and 6C, respectively.

In some embodiments, the transceiver module 750 in conjunction with antenna(s) 745, along with other possible components of base station 105-d, may receive or transmit information or messages corresponding to a transmission cycle. In some embodiments, the transceiver module 750 in conjunction with antenna(s) 745, along with other possible components of base station 105-d, may receive or transmit information or messages corresponding to the wireless device 115-e, to other base stations 105-m/105-n, or core network 130-a, such as a list of connected devices.

Figure 8:
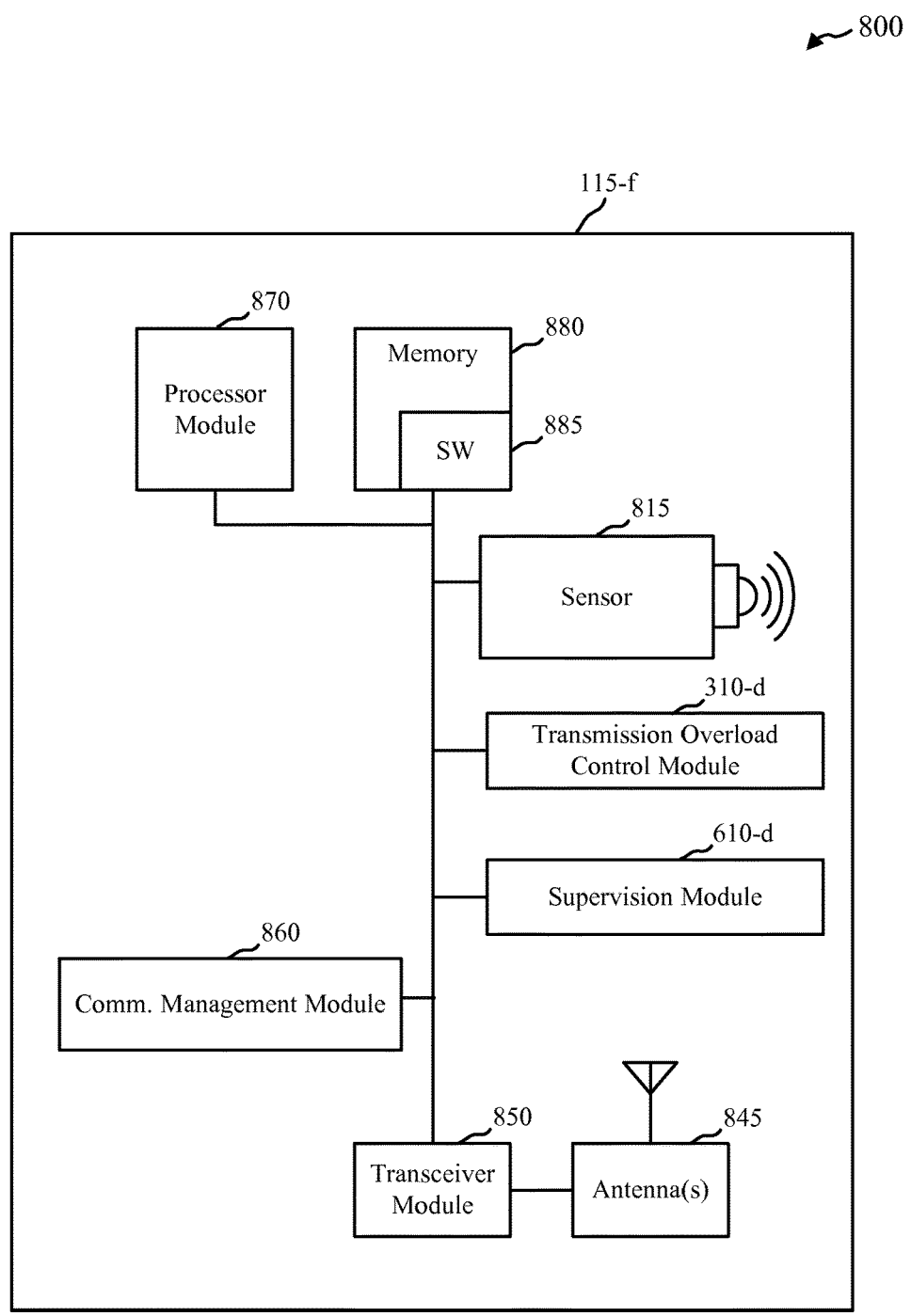
FIG. 8 shows a diagram of a wireless communications system according to some embodiments.

FIG. 8 is a block diagram 800 of a wireless device 115-f configured for overload control and/or supervision in accordance with various embodiments. The wireless device 115-f may have any of various configurations, such as a sensor or monitor for various MTC applications discussed above. The wireless device 115-*f* may have an internal power supply (not shown), such as a small battery, to facilitate mobile operation. The wireless device 115-*f* may be an MTC device, including an ultra-low power MTC device. In some embodiments, the wireless device 115-*f* may be the wireless device 115 of FIGS. 1, 2, 4A, 4B, 5A, and/or 5B. The wireless device 115-*f* may include aspects of devices 300-*a*, 300-*b*, 300-*c*, 600-*a*, 600-*b*, and/or 600-*c* of FIGS. 3A, 3B, 3C, 6A, 6B and/or 6B. Although discussed in terms of an MTC device, device 115-*f* may, in some embodiments, be a UE that may have a long sleep cycle. Device 115-*f* may be an ultra-low power MTC. In some aspects, device 115-*f* may include delay-tolerant features such that it may be capable of operating for extended time periods without transmitting or receiving a signal.

The wireless device 115-*f* may include a transmission overload control module 310-*d* and/or a supervision module 610-*d*, a sensor 815, antenna(s) 845, a transceiver module 850, memory 880, and a processor module 870, which each may be in communication, directly or indirectly, with each other (e.g., via one or more buses). The transceiver module 850 may be configured to communicate bi-directionally, via the antenna(s) 845 and/or one or more wired or wireless links, with one or more networks, as described above. For example, the transceiver module 850 may be configured to communicate bi-directionally with base stations 105 of FIG. 1, FIGS. 2, 4A, and/or 4B. The transceiver module 850 may include a modem configured to modulate packets and provide the modulated packets to the antenna(s) 845 for transmission, and to demodulate packets received from the antenna(s) 845. While the wireless device 115-*f* may include a single antenna 845, the wireless device 115-*f* may include multiple antennas 845 for multiple transmission links. In some cases, the sensor 815 may be an aspect of a meter or implement other monitoring functionality of the wireless device 115-*f*. The input of the sensor 815 may be communicated to, e.g., a server (not shown) via the other components of the wireless device 815 and a base station.

The memory 880 may include random access memory (RAM) and read-only memory (ROM). The memory 880 may store computer-readable, computer-executable software code 885 containing instructions that are configured to, when executed, cause the processor module 870 to perform various functions described herein (e.g., transmission overload control, supervision, keep-alive messaging, etc.). Alternatively, the software code 885 may not be directly executable by the processor module 870 but be configured to cause the computer (e.g., when compiled and executed) to perform functions described herein.

The processor module 870 may include an intelligent hardware device, e.g., a central processing unit (CPU) such as those made by Intel® Corporation or AMD®, a microcontroller, an application-specific integrated circuit (ASIC), etc.

According to the architecture of FIG. 8, the wireless device 115-*f* may further include a communications management module 860. The communications management module 860 may manage communications with base stations 105 and/or other wireless devices 115. By way of example, the communications management module 860 may be a component of the wireless device 115-*f* in communication with some or all of the other components of the wireless device 115-*f* via a bus. Alternatively, functionality of the communications management module 860 may be implemented as a component of the transceiver module 850, as a computer program product of a non-transitory computer readable medium, and/or as one or more controller elements of the processor module 870.

The components for the wireless device 115-*f* may be configured to implement aspects discussed above with respect to devices 300-*a*, 300-*b*, or 300-*c* of FIGS. 3A, 3B, and 3C, respectively, and may not be repeated here for the sake of brevity. For example, the transmission overload control module 310-*d* may include similar functionality as the module 310 of FIG. 3A. Aspects of 310-*a* and/or 310-*b* of FIGS. 3B and 3C, respectively, may be examples of aspects of the transmission overload control module 310-*d*.

In some embodiments, the transceiver module 850 in conjunction with antenna(s) 845, along with other possible components of the wireless device 115-*f*, may transmit information regarding SR and/or RACH messages from the wireless device 115-*f* to base stations or a core network. In some embodiments, the transceiver module 850, in conjunction with antennas 845 along with other possible components of the wireless device 115-*f*, may transmit information, related to wireless device overload control and supervision, including transmission cycle, off cycle, DRX cycle, connected list status, to base stations or a core network such that these devices or systems may utilize flexible waveforms.

Figure 9:
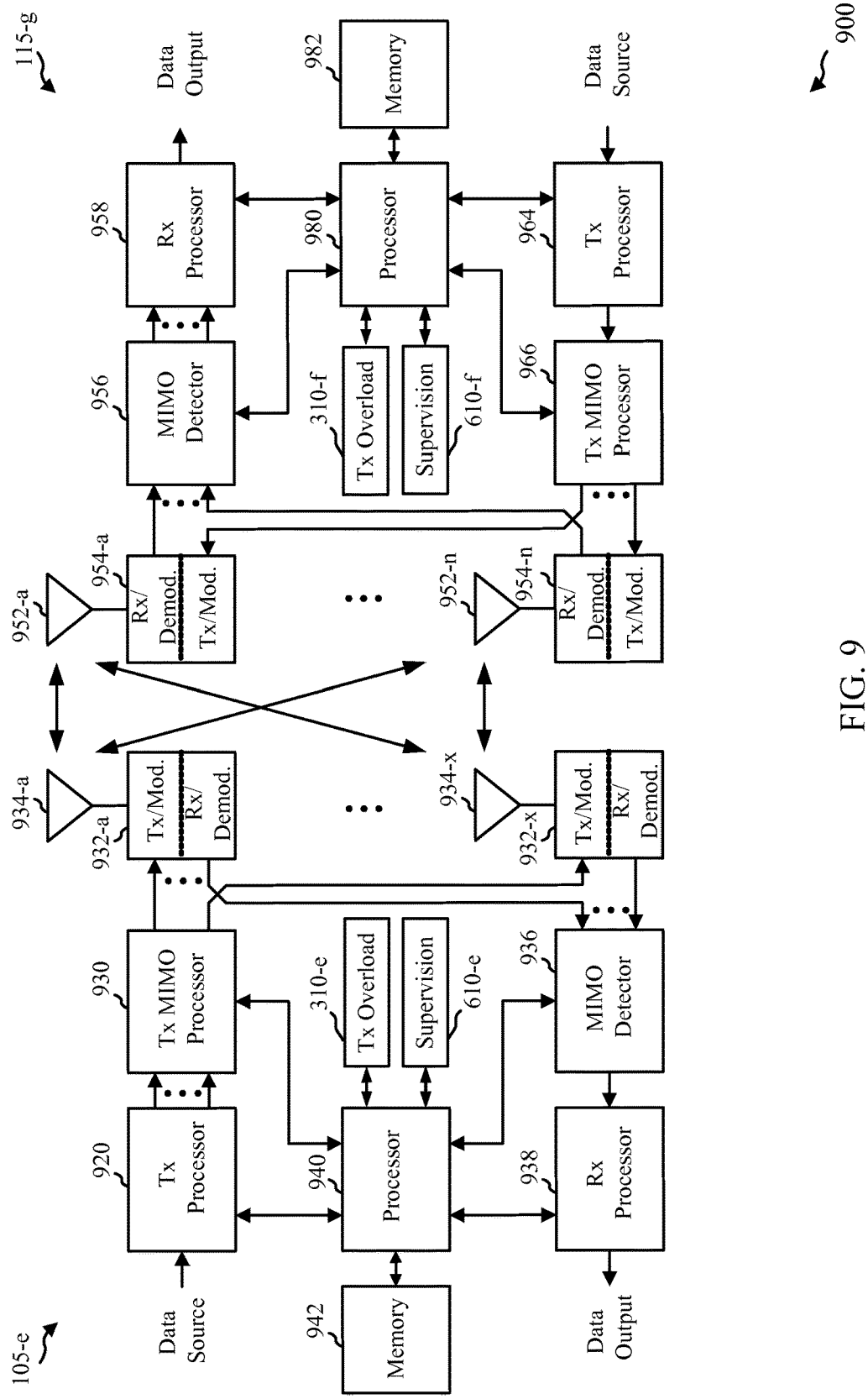
FIG. 9 shows a diagram of a wireless communications system according to some embodiments.

FIG. 9 is a block diagram of a system 900 including a base station 105-*e* and an MTC device 115-*g* in accordance with various embodiments. This system 900 may be an example of aspects of the system 100 of FIG. 1, system 200 of FIG. 2, system 400-*a* of FIG. 4, and/or system 500-*a* of FIG. 5. The base station 105-*e* may be equipped with antennas 934-*a* through 934-*x*, and the wireless device 115-*g* may be equipped with antennas 952-*a* through 952-*n*. At the base station 105-*e*, a transmit processor 920 may receive data from a data source. For example, the base station 105-*e* may communicate with one or more UEs that may have a long sleep cycle. In some embodiments, the base station 105-*e* may communicate with an MTC device, which may be an ultra-low power MTC device. In some aspects, the base station 105-*e* may be capable of communicating with delay-tolerant devices, which themselves may be capable of operating for extended time periods without transmitting or receiving a signal.

The transmitter processor 920 may process the data. The transmitter processor 920 may also generate reference symbols, and a cell-specific reference signal. A transmit (TX) MIMO processor 930 may perform spatial processing (e.g., precoding) on data symbols, control symbols, and/or reference symbols, if applicable, and may provide output symbol streams to the transmit modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932-*a* through 932-*x* may be transmitted via the antennas 934-*a* through 934-*x*, respectively. The transmitter processor 920 may receive information from a processor 940. The processor 940 may be configured to communicate with a transmission overload control module 310-*e* and a supervision module 610-*e*, in accordance with the embodiments described above in conjunction with 310, 310-*a*, 310-*b*, 610, 610-*a*, and 610-*b* in FIGS. 3A, 3B, 3C, 6A, 6B, and 6C. In some embodiments, the processor 940 may be implemented as part of a general processor, the transmitter processor 920, and/or the receiver processor 938. A memory 942 may be coupled with the processor 940.

In some embodiments, the processor 940 is configured to determine and/or establish a transmission, off, DTX, and/or DRX cycle for MTC devices 115. For example, processor 940 may be configured to establish a discontinuous transmission cycle for SR and RACH messages for the wireless device 115-*g*, in conjunction with transmitter processor 920 and transmitter MIMO processor 930, modulators 932 and antennas 934. Processor 940 may further be configured to determine a list of connected wireless devices 115, and process messages received in response to a broadcast of a list of connected devices, through MIMO detector 936 and processor 938, de-modulators 932, and antennas 934.

The processor 940 may further be configured to determine a list of connected wireless devices 115 that have not transmitted a keep-alive message within a time period specified and/or determined by the processor 940.

At the wireless device 115-*g*, the mobile device antennas 952-*a* through 952-*n* may receive the DL signals from the base station 105-*e* and may provide the received signals to the demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols if applicable, and provide detected symbols. A receiver processor 958 may process (e.g., demodulate, deinterleave, and decode) the detected symbols, providing decoded data for the MTC device 115-*g* to a data output, and provide decoded control information to a processor 980, or memory 982.

On the uplink (UL), at the wireless device 115-*g*, a transmitter processor 964 may receive and process data from a data source. The transmitter processor 964 may also generate reference symbols for a reference signal. The symbols from the transmitter processor 964 may be precoded by a transmit MIMO processor 966 if applicable, further processed by the demodulators 954-*a* through 954-*n* (e.g., for SC-FDMA, etc.), and be transmitted to the base station 105-*e* in accordance with the transmission parameters received from the base station 105-*e*. The transmitter processor 964 may be configured to identify a transmission cycle for an uplink channel, initiate a timer after a handshake with the base station 105-*e*, and/or coordinate transmission of a keep-alive message, in accordance with the embodiments described above in conjunction with 310, 310-*a*, 310-*b*, 610, 610-*a*, and 610-*b* in FIGS. 3A, 3B, 3C, 6A, 6B, and 6C, respectively. At the base station 105-*e*, the UL signals from the wireless device 115-*g* may be received by the antennas 934, processed by the demodulators 932, detected by a MIMO detector 936 if applicable, and further processed by a receive processor 938. The receive processor 938 may provide decoded data to a data output and to the processor 940. In some embodiments, the processor 940 may be implemented as part of a general processor, the transmitter processor 920, and/or the receiver processor 938.

In some embodiments, the processor 980 is configured to utilize one or more timers for powering on and off various components of the wireless device 115-*g*. In some embodiments, the processor 980 is configured to utilize and transmit according to an identified SR/RACH transmission cycle, DTX cycle, and or a DRX cycle mask. For example, processor 980 may be configured to limit transmission only during periods designated by the base station 105-*e*, in conjunction with transmitter processor 964 and transmitter MIMO processor 966, modulators 954 and antennas 952.

Processor 980 may further be configured to wake up to receive transmissions according to a DRX cycle designated by the base station 105-*e*, through MIMO detector 956 and receiver processor 958, de-modulators 954, and antennas 952.

The processor 980 may further be configured to initiate a timer after a handshake between the wireless device 115-*g* and the base station 105-*e*, and to facilitate transmission of a keep-alive handshake initiation message to the base station 105-*e* when the timer expires. The processor 980 may further be configured to reset a timer after each handshake with the base station 105-*e*.

Figure 10A:
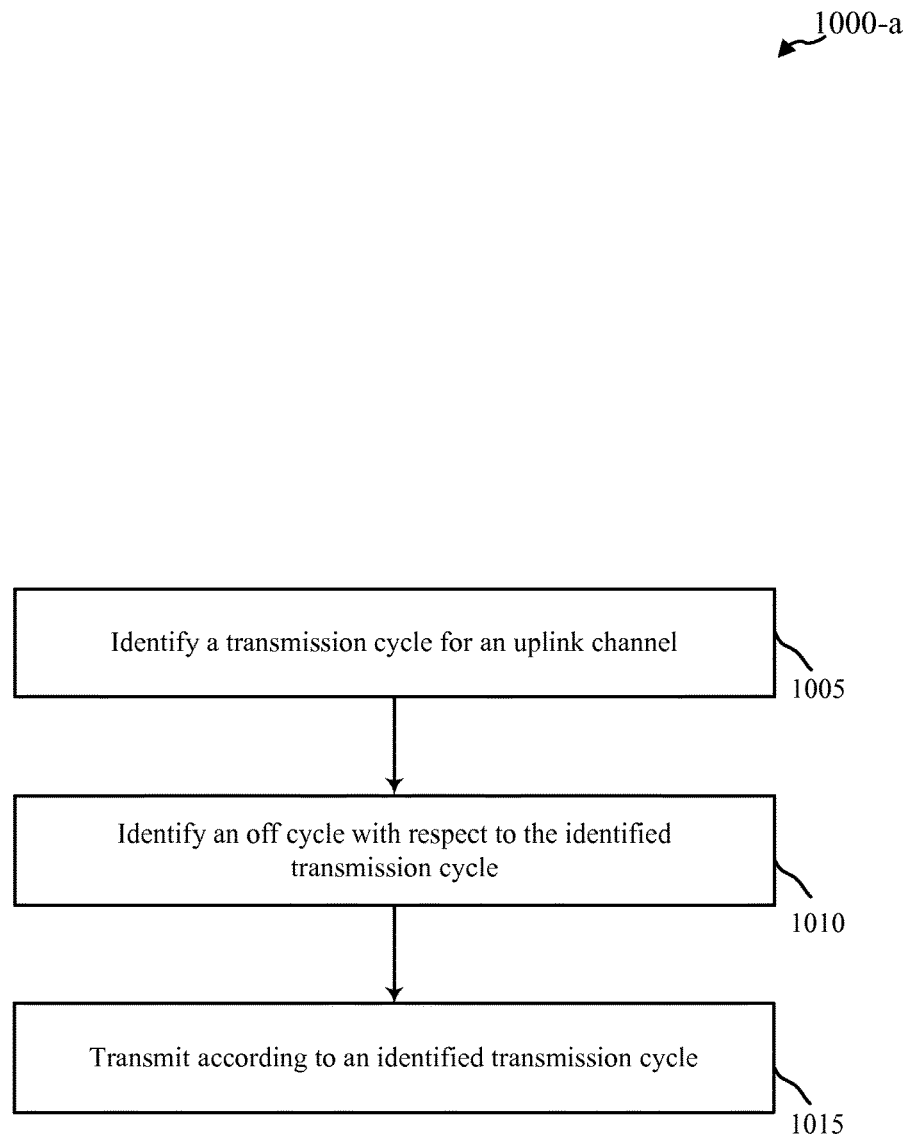
FIGS. 10A and 10B show flowcharts of a method or methods of communicating in a wireless communications system according to some embodiments.

FIG. 10A is a flow chart illustrating an example of a method 1000-*a* for implementing transmission overload control of wireless devices. For clarity, the method 1000-*a* is described below with reference to wireless devices 115 shown and referenced in each of the preceding FIGS. In some implementations, the transmission overload control module 310 may execute one or more sets of codes to control the functional elements of the wireless device 115 or the devices 300-*a*, 300-*b*, and/or 300-*c* to perform the functions described below.

At block 1005, the wireless device 115 may identify a transmission cycle for an uplink channel. The transmission cycle may be determined by a base station 105. The transmission cycle may include staggered periods during which various components of the wireless device 115 are powered on. The transmission cycle may be an aspect of a DTX cycle. The DTX cycle may use one or more timers for powering on or off and/or monitoring one or more components of, activity of, and/or inactivity of, the wireless device 115. The transmission cycle may utilize a DRX cycle mask.

At block 1010, the wireless device 115 may identify an off cycle with respect to the identified transmission cycle. The off cycle may be aspect of a DTX cycle. The wireless device 115 may thus refrain from transmitting during the off cycle.

At block 1015, the wireless device 115 may transmit according to the identified transmission cycle. The wireless device 115 may be one of a set of devices 115 transmitting according to the same transmission cycle, while another wireless device 115 may be one of another, separate set of devices 115 transmitting according to a separate, staggered transmission cycle. The wireless device 115 may transmit according to a transmission cycle that corresponds to a DRX cycle, and the DRX cycle may be more sparse or more dense than the transmission cycle. The DRX ON durations of a DRX cycle may coincide with a DTX ON duration of a DTX cycle. The DTX cycle may have shorter or longer periods than a DRX cycle. The wireless device 115 may remain in RRC_CONNECTED state throughout the transmission cycle. In some cases, the wireless device 115 remains in RRC_CONNECTED state while in a sleep mode. In some embodiments, the wireless device 115 is an MTC device, such as an ultra-low power MTC device. Additionally or alternatively, the wireless devices 115 may be delay tolerant, where delay tolerance is defined with respect to a threshold (e.g., a threshold period of time during which the wireless device need not communicate with another wireless device or a base station without losing synchronization) Delay tolerance may thus be linked to a transmission cycle. In some embodiments, the wireless devices 115 may be UEs that may have long sleep cycles. The wireless device 115 may receive a transmission cycle and/or an off cycle from a base station 105. And the wireless device 115 may operate according to the transmission cycle received from a base station 105.

Figure 10B:
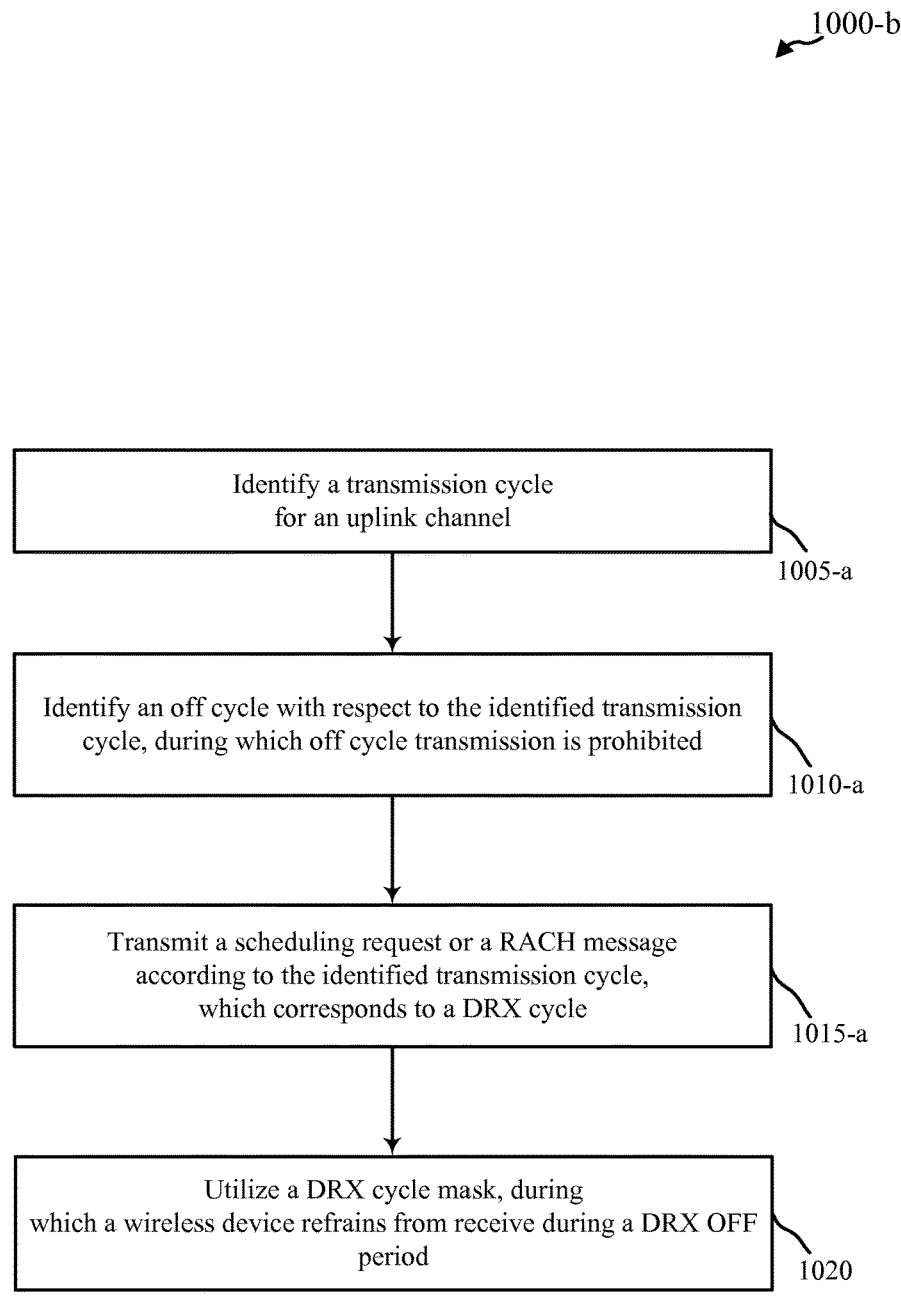

FIG. 10B is a flow chart illustrating an example of a method 1000-*b*, which may be an example of aspects of the method 1000-*a*. For clarity, the method 1000-*b* is described below with reference to the wireless devices 115 shown and referenced in each of the preceding FIGS. In one implementation, the transmission overload control module 310 may execute one or more sets of codes to control the functional elements of the wireless device 115 or the device 300-*a*, 300-*b*, and/or 300-*c* to perform the functions described below. Method 1000-*b* may be an example of method 1000-*a*.

At block 1005-*a*, the wireless device 115 may identify a transmission cycle for an uplink channel. At block 1010-*a*, the wireless device 115 may identify an off cycle with respect to an identified transmission cycle, during which off cycle the wireless device 115 refrains from transmitting. At block 1015-*a*, the wireless device 115 may transmit a scheduling request or a RACH message according to the identified transmission cycle, which corresponds to a DRX cycle. At block 1020, the wireless device 115 may utilize a DRX cycle mask, during which the wireless device 115 refrains from receiving during a DRX OFF period.

Figure 11A:
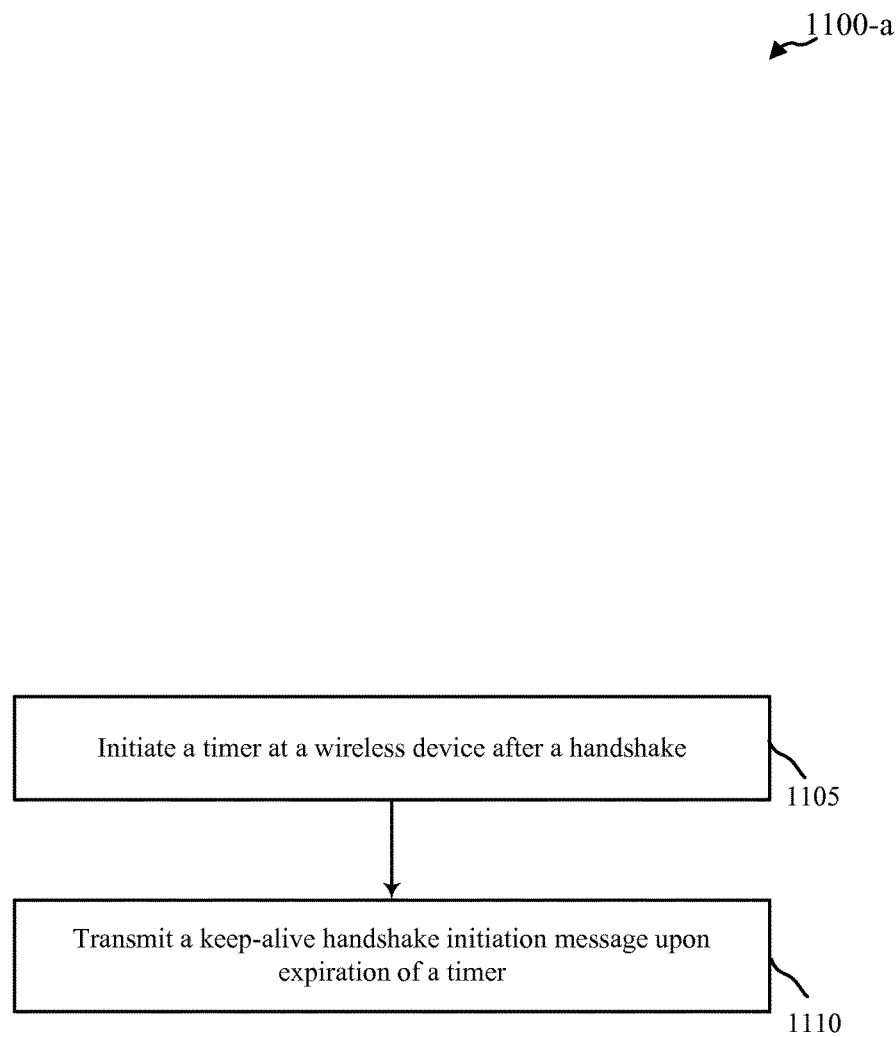
FIGS. 11A and 11B show flowcharts of a method or methods of communicating in a wireless communications system according to some embodiments.

FIG. 11A is a flow chart illustrating an example of a method 1100-*a* for implementing supervision of wireless devices. For clarity, the method 1100-*a* is described below with reference to base stations 105 a wireless devices 115 shown and referenced in the preceding FIGS. In one implementation, the supervision module 610 may execute one or more sets of codes to control the functional elements of the base stations 105, the wireless devices 115, or the device 600-*a* and/or 600-*b* to perform the functions described below.

At block 1105, the base station 105 or the wireless device 115 may initiate a timer at the wireless device 115 after a handshake between the wireless device 115 and a base station 105. The timer may be reset after each subsequent handshake. At block 1110, the wireless device 115 may transmit a keep-alive handshake initiation message upon expiration of a timer. The keep-alive handshake initiation message may include a scheduling request (SR) or a RACH message. The wireless device 115 may listen to a response message or uplink grant from a base station 105. The wireless device 115 may reply with a closing message or in a payload with a closing message. In some embodiments, the wireless devices 115 may be delay tolerant, which may be defined with respect to a threshold. Additionally or alternatively, delay tolerance may be linked to a transmission cycle. In some embodiments, the wireless devices 115 are UEs having long sleep cycles.

Figure 11B:
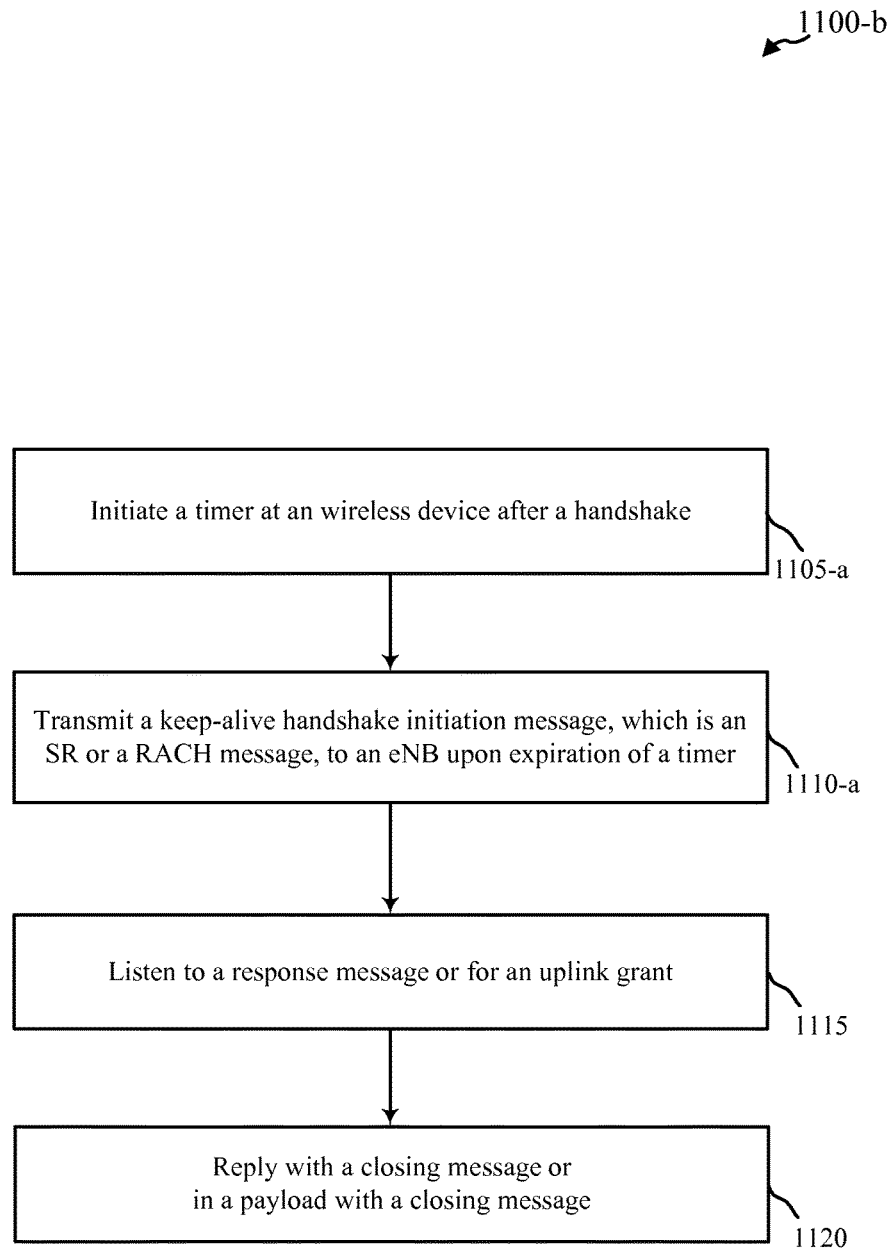

FIG. 11B is a flow chart illustrating an example of a method 1100-*b*, which may be an example of aspects of the method 1100-*a*. For clarity, the method 1100-*b* is described below with reference to base stations 105 the wireless device 115 shown and referenced in each of the preceding FIGS. In one implementation, the supervision module 610 may execute one or more sets of codes to control the functional elements of the base stations 105, wireless device 115 or the device 600-*a*, 600-*b*, and/or 600-*c* to perform the functions described below. Method 1100-*b* may be an example of method 1100-*a*.

At block 1105-*a*, a wireless device 115 may initiate a timer at the wireless device 115 after a handshake between base station 105 and the wireless device 115. At block 1110-*a*, the wireless device 115 may transmit a keep-alive message, which is an SR or a RACH message to the base station 105 upon the expiration of a timer. At block 1115, the wireless device 115 listens to a response message or for an uplink grant from the base station 105. At block 1120, the wireless device replies with a closing message or replies in a payload with a closing message.

Figure 12A:
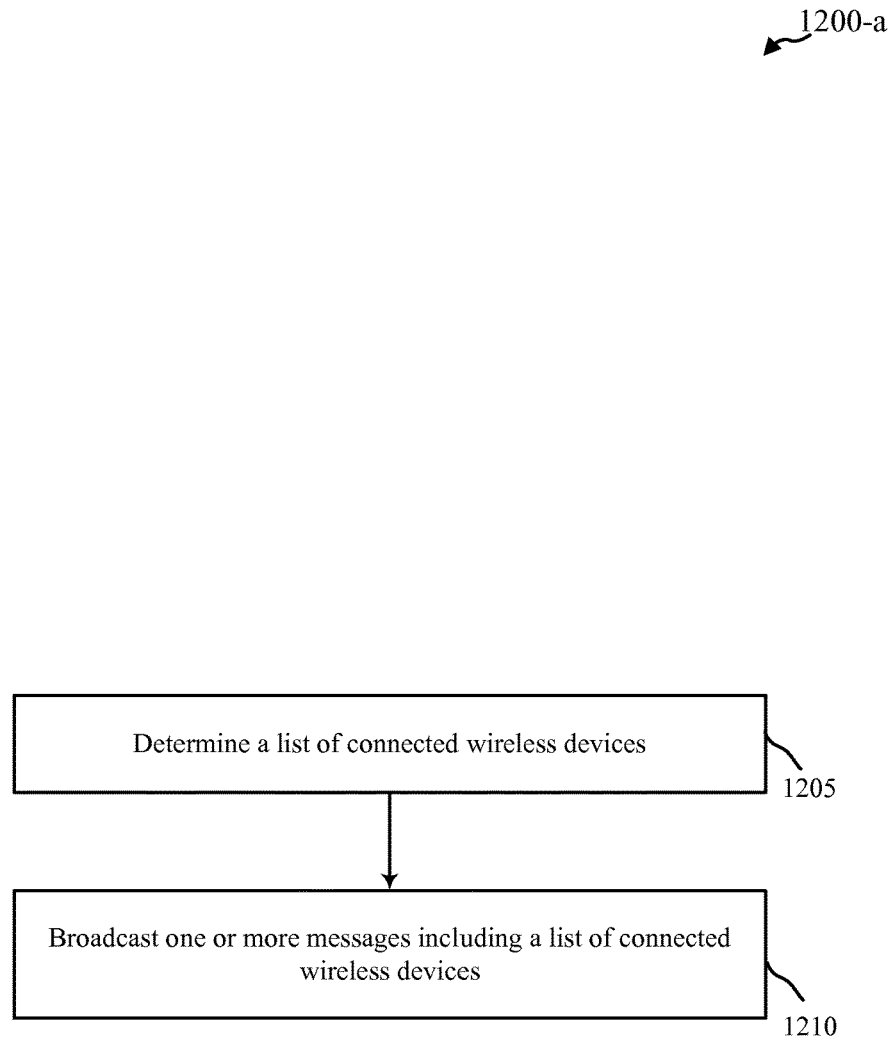
FIGS. 12A and 12B show flowcharts of a method or methods of communicating in a wireless communications system according to some embodiments.

FIG. 12A is a flow chart illustrating an example of a method 1200-*a* for implementing supervision of wireless devices. For clarity, the method 1200-*b* is described below with reference to base stations 105 and wireless devices 115. In one implementation, the supervision module 610 may execute one or more sets of codes to control the functional elements of the base stations 105, the wireless devices 115, or the devices 600-*a*, 600-*b*, and/or 600-*c* to perform the functions described below.

At block 1205, a base station may determine a list of connected wireless devices 115. The list of connected devices may include one or more wireless devices 115 that have not transmitted a keep-alive handshake initiation message (e.g., not transmitted a RACH message or a SR) within a time period determined or communicated to the base station 105. At block 1210, a base station may broadcast one or more messages including a list of connected wireless devices. The base station may broadcast in one or more messages based on or according to a staggered DRX cycle. A broadcast message may include only a subset of connected wireless devices 115 from a list of connected devices. The base station may receive a response message from a wireless device 115 indicating that the wireless device 115 is not, but should be on the list of connected devices. In some embodiments, the wireless devices 115 are delay tolerant, where delay tolerance is defined with respect to a threshold. Additionally or alternatively, delay tolerance may be linked to a transmission cycle. In some embodiments, the wireless devices 115 are UEs having long sleep cycles.

Figure 12B:
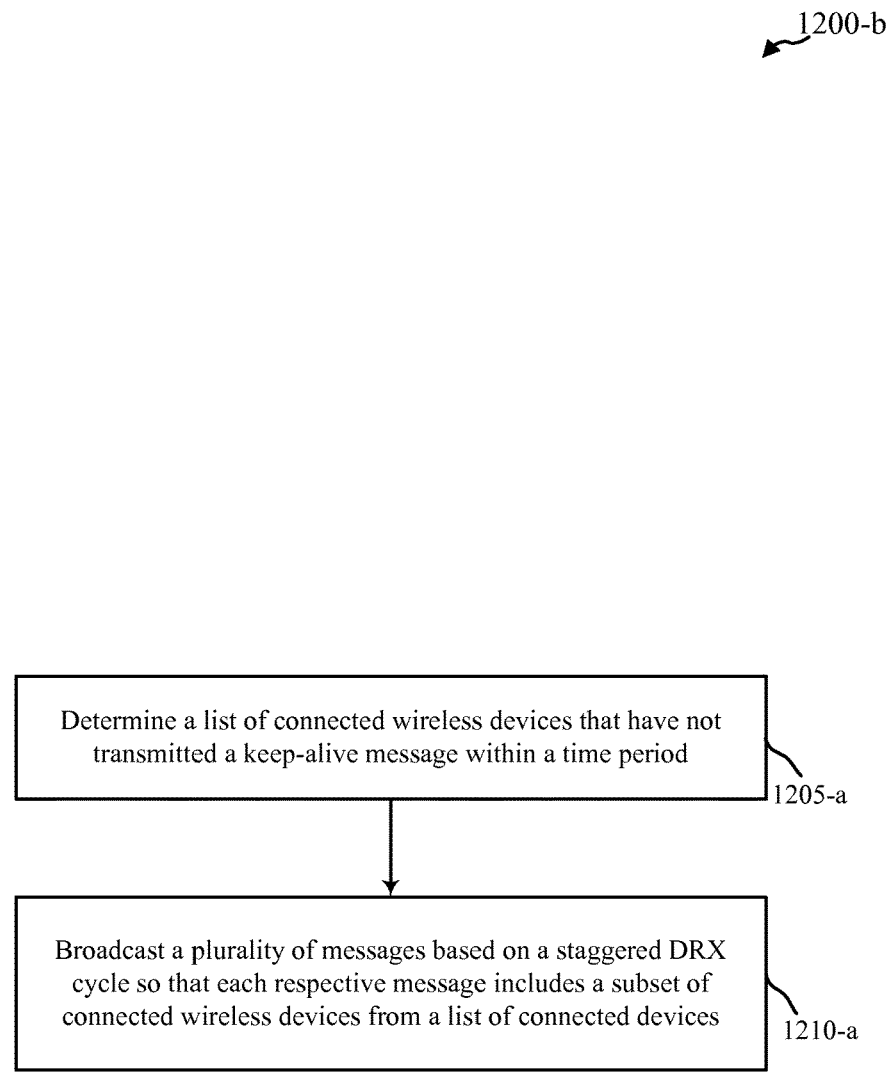

FIG. 12B is a flow chart illustrating an example of a method 1200-*b*, which may be an example of aspects of the method 1200-*a*. For clarity, the method 1200-*b* is described below with reference to base stations 105 wireless devices 115 shown and referenced in each of the preceding FIGS. In one implementation, the supervision module 610 may execute one or more sets of codes to control the functional elements of the base stations 105, wireless device 115 or the devices 600-*a*, 600-*b*, and/or 600-*c* to perform the functions described below. Method 1200-*b* may be an example of method 1200-*a*.

At block 1205-*a*, the base station 105 may determine a list of connected MTC devices that have not transmitted a keep-alive handshake initiation message within a time period. At block 1210-*a*, the base station 105 may broadcast a plurality of messages based on a staggered DRX cycle so that each respective message includes a subset of connected wireless devices 115 from a list of connected devices.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method for wireless communication comprising:
   receiving a discontinuous transmission (DTX) cycle indication from a base station;
   identifying, by a wireless device in a connected state, a first transmission cycle of a DTX cycle for an uplink channel based at least in part on the DTX cycle indication, wherein the wireless device is part of a first set of wireless devices utilizing the first transmission cycle, and wherein a second set of wireless devices utilizing a second transmission cycle that is staggered from the first transmission cycle refrain from transmission during the first transmission cycle;
   identifying a first off cycle of the DTX cycle with respect to the first transmission cycle for the uplink channel, wherein the wireless device refrains from transmitting during the first off cycle; and
   transmitting, by the wireless device, a scheduling request or a random access channel message during the first transmission cycle of the DTX cycle, the first transmission cycle and second transmission cycle comprising staggered times for scheduling request or random access channel message transmissions.

2. The method of claim 1, wherein:
   the connected state comprises an RRC_CONNECTED state.

3. The method of claim 1, wherein the wireless device comprises a delay-tolerant device having a delay tolerance defined with respect to a threshold, and wherein the delay tolerance is based at least in part on the first transmission cycle.

4. The method of claim 1, further comprising:
   transmitting according to the received DTX cycle indication.

5. The method of claim 1, further comprising:
   utilizing a discontinuous reception (DRX) cycle comprising DRX ON durations and DRX OFF durations, wherein the wireless device refrains from receiving during the DRX OFF durations.

6. The method of claim 5, wherein each DRX ON duration of the DRX cycle coincides with a DTX ON duration of the DTX cycle, and wherein the DTX cycle has a shorter period than the DRX cycle.

7. The method of claim 5, wherein each DTX ON duration of the DTX cycle coincides with a DRX ON duration of the DRX cycle, and wherein the DRX cycle has a shorter period than the DTX cycle.

8. The method of claim 1, further comprising:
   receiving, at the wireless device in the connected state, a broadcast message corresponding to a list of connected devices from the base station, wherein the list of devices excludes the wireless device; and
   transmitting, to the base station, a response message indicating that the wireless device be on the list of connected devices.

9. A device for wireless communication comprising:
a processor;
memory in electronic communication with the processor; and
instructions stored in the memory, the instructions being executable by the processor to:
receive a discontinuous transmission (DTX) cycle indication from a base station;
identify, by a wireless device in a connected state, a first transmission cycle of a DTX cycle for an uplink channel based at least in part on the DTX cycle indication, wherein the wireless device is part of a first set of wireless devices utilizing the first transmission cycle, and wherein a second set of wireless devices utilizing a second transmission cycle that is staggered from the first transmission cycle refrain from transmission during the first transmission cycle;
identify a first off cycle of the DTX cycle with respect to the first transmission cycle for the uplink channel, wherein the wireless device refrains from transmitting during the first off cycle; and
transmit, by the wireless device, a scheduling request or a random access channel message during the first transmission cycle of the DTX cycle, the first transmission cycle and second transmission cycle comprising staggered times for scheduling request or random access channel message transmissions.

10. The device of claim 9, wherein:
the connected state comprises an RRC_CONNECTED state.

11. The device of claim 9, wherein the wireless device comprises a delay-tolerant device having a delay tolerance defined with respect to a threshold, and wherein the delay tolerance is based at least in part on the first transmission cycle.

12. The device of claim 9, wherein the instructions are executable by the processor to:
transmit according to the received DTX cycle indication.

13. The device of claim 9, wherein the instructions are executable by the processor to:
utilize a discontinuous reception (DRX) cycle comprising DRX ON durations and DRX OFF durations, wherein the wireless device refrains from receiving during the DRX OFF durations.

14. The device of claim 13, wherein each DRX ON duration of the DRX cycle coincides with a DTX ON duration of the DTX cycle, and wherein the DTX cycle has a shorter period than the DRX cycle.

15. The device of claim 13, wherein each DTX ON duration of the DTX cycle coincides with a DRX ON duration of the DRX cycle, and wherein the DRX cycle has a shorter period than the DTX cycle.

16. The device of claim 9, wherein the instructions are executable by the processor to:
receive, at the wireless device in the connected state, a broadcast message corresponding to a list of connected devices from the base station, wherein the list of devices excludes the wireless device; and
transmit, to the base station, a response message indicating that the wireless device be on the list of connected devices.

* * * * *